US012605857B2

(12) United States Patent
Goldfarb et al.

(10) Patent No.: US 12,605,857 B2
(45) Date of Patent: Apr. 21, 2026

(54) INTELLIGENT SHAVING SYSTEM HAVING SENSORS

(71) Applicants: Haggai Goldfarb, Tacoma, WA (US);
Simon Oren, New York, NY (US)

(72) Inventors: Haggai Goldfarb, Tacoma, WA (US);
Simon Oren, New York, NY (US)

( * ) Notice: Subject to any disclaimer, the term of this patent is extended or adjusted under 35 U.S.C. 154(b) by 0 days.

(21) Appl. No.: 19/251,705

(22) Filed: Jun. 26, 2025

(65) Prior Publication Data

US 2025/0319619 A1      Oct. 16, 2025

Related U.S. Application Data

(63) Continuation of application No. 18/642,088, filed on Apr. 22, 2024, which is a continuation of application
(Continued)

(51) Int. Cl.
B26B 21/40          (2006.01)
B26B 21/22          (2006.01)
(Continued)

(52) U.S. Cl.
CPC ........ B26B 21/4056 (2013.01); B26B 21/225 (2013.01); B26B 21/28 (2013.01);
(Continued)

(58) Field of Classification Search
CPC ... B26B 21/40; B26B 21/405; B26B 21/4056; B26B 21/4087; B26B 21/526;
(Continued)

(56) References Cited

U.S. PATENT DOCUMENTS 1,485,093 A      2/1924   Stuart
1,821,825 A      9/1931   Zumwalt
(Continued)

FOREIGN PATENT DOCUMENTS

DE          102018112527 A1      11/2019
WO          WO-2009076301 A2 *   6/2009   ......... B26B 21/4056
(Continued)

OTHER PUBLICATIONS

International Preliminary Report on Patentability issued for PCT Patent Application No. PCT/US2015/064339, mailed on Jun. 13, 2017, 8 pages.
(Continued)

*Primary Examiner* — Jason Daniel Prone

(57)                ABSTRACT
A shaving system including a handle, a cutting member, a sensor, a feedback indicator, and a microcontroller. The sensor is configured to detect a force exerted by the user. The feedback indicator includes an indicator display that is configured to generate a first indication in response to and representative of the force detected by the sensor. The microcontroller is configured to generate a first signal based on the detected force and send the first signal to the feedback indicator such that the feedback indicator generates the first indication during the shaving session to assist the user with shaving. The microcontroller is configured to send a second signal indicative of a change in force to the feedback indicator such that the feedback indicator generates a second indication including illumination in response to and representative of the change in force during the shaving session to assist the user with shaving.

40 Claims, 19 Drawing Sheets

Related U.S. Application Data

No. 17/321,710, filed on May 17, 2021, now Pat. No. 11,964,405, which is a continuation of application No. 16/025,128, filed on Jul. 2, 2018, now Pat. No. 11,007,659, which is a continuation-in-part of application No. 14/961,842, filed on Dec. 7, 2015, now abandoned.

(60) Provisional application No. 62/090,335, filed on Dec. 10, 2014.

(51) Int. Cl.

| | |
|---|---|
| *B26B 21/28* | (2006.01) |
| *B26B 21/52* | (2006.01) |
| *B26B 21/56* | (2006.01) |
| *B26B 21/58* | (2006.01) |
| *G06T 7/00* | (2017.01) |

(52) U.S. Cl.
CPC ........ *B26B 21/4087* (2013.01); *B26B 21/526* (2013.01); *B26B 21/56* (2013.01); *B26B 21/565* (2013.01); *B26B 21/4068* (2013.01); *B26B 21/58* (2013.01); *G06T 7/001* (2013.01)

(58) Field of Classification Search
CPC ........ G06T 7/0004; G06T 7/001; G06T 7/40; G06T 2207/30088; G06T 2207/30201
USPC .................................................. 30/34.05, 41.7
See application file for complete search history.

(56) References Cited

U.S. PATENT DOCUMENTS

| | | | |
|---|---|---|---|
| 2,069,465 | A | 2/1937 | Wallenbeck |
| 2,108,267 | A | 2/1938 | Bernard |
| 2,213,062 | A | 8/1940 | Anthony |
| 2,421,205 | A | 5/1947 | Kingsley |
| 2,598,711 | A | 6/1952 | Pasquale |
| 3,331,129 | A | 7/1967 | Goudie |
| 3,407,496 | A | 10/1968 | Pomper |
| 3,412,464 | A | 11/1968 | Keck |
| 3,444,499 | A | 5/1969 | Lovelace |
| 3,597,841 | A | 8/1971 | Miller |
| 3,654,701 | A | 4/1972 | Hastings, Sr. |
| 3,777,396 | A | 12/1973 | Simonetti |
| 4,030,193 | A | 6/1977 | Mandilaras |
| 4,208,791 | A | 6/1980 | Van Cleve |
| 4,459,744 | A | 7/1984 | Esnard |
| 4,516,320 | A | 5/1985 | Peleckis |
| 4,599,793 | A | 7/1986 | Iten |
| 4,603,477 | A | 8/1986 | Francis |
| 4,605,919 | A | 8/1986 | Wilner |
| 4,720,917 | A | 1/1988 | Solow |
| 4,782,590 | A | 11/1988 | Pope |
| 4,875,288 | A | 10/1989 | Trotta et al. |
| 4,893,641 | A | 1/1990 | Strickland |
| 4,901,437 | A | 2/1990 | Iten |
| 4,961,262 | A | 10/1990 | Lawrence |
| 4,980,974 | A | 1/1991 | Radcliffe |
| 4,993,154 | A | 2/1991 | Radcliffe |
| 5,153,992 | A | 10/1992 | Brown et al. |
| 5,199,173 | A | 4/1993 | Hegemann et al. |
| 5,201,253 | A | 4/1993 | Lazarchik et al. |
| 5,208,982 | A | 5/1993 | Ferruzza, Jr. |
| 5,240,107 | A | 8/1993 | Casale |
| 5,347,715 | A | 9/1994 | Friedland |
| 5,490,329 | A | 2/1996 | Chylinski et al. |
| 5,604,983 | A | 2/1997 | Simms et al. |
| 5,704,127 | A | 1/1998 | Cordio |
| 5,979,056 | A | 11/1999 | Andrews |
| 6,009,623 | A | 1/2000 | Orloff |
| 6,145,201 | A | 11/2000 | Andrews |
| 6,494,882 | B1 | 12/2002 | Lebouitz et al. |
| 6,634,104 | B2 | 10/2003 | Jacobsen |
| 7,100,283 | B1 | 9/2006 | Grdodian et al. |
| 7,730,619 | B2 | 6/2010 | Ozenick |
| 7,992,307 | B2 * | 8/2011 | Smal ..................... B26B 19/388 30/202 |
| 8,056,240 | B2 | 11/2011 | Harris, II |
| 8,881,406 | B2 | 11/2014 | Glezerman |
| 8,938,884 | B2 * | 1/2015 | Kammer .............. B26B 19/388 30/201 |
| 9,227,331 | B2 | 1/2016 | Zhuk et al. |
| 9,848,174 | B2 | 12/2017 | Binder |
| 9,878,458 | B2 | 1/2018 | Park et al. |
| 9,950,435 | B2 | 4/2018 | Binder |
| 10,179,418 | B2 * | 1/2019 | Hendriks ............ B26B 21/4056 |
| 10,357,092 | B2 | 7/2019 | Kustra et al. |
| 10,456,933 | B2 | 10/2019 | Binder |
| 10,486,322 | B2 | 11/2019 | Park et al. |
| 11,007,659 | B2 | 5/2021 | Goldfarb et al. |
| 11,455,747 | B2 | 9/2022 | Robinson et al. |
| 11,504,866 | B2 | 11/2022 | Tsegenidis et al. |
| 11,529,745 | B2 | 12/2022 | Zafiropoulos |
| 11,673,282 | B2 * | 6/2023 | Good .................. B26B 21/4056 83/34 |
| 11,833,700 | B2 * | 12/2023 | Georgakis .......... B26B 21/4056 |
| 11,964,405 | B2 | 4/2024 | Goldfarb et al. |
| 2002/0189102 | A1 | 12/2002 | Orloff |
| 2003/0182802 | A1 | 10/2003 | Vega et al. |
| 2004/0098862 | A1 | 5/2004 | Orloff |
| 2006/0026841 | A1 | 2/2006 | Freund |
| 2006/0032055 | A1 | 2/2006 | Simms et al. |
| 2006/0277760 | A1 | 12/2006 | Lee |
| 2008/0052911 | A1 | 3/2008 | Kohler |
| 2008/0052912 | A1 | 3/2008 | Barry et al. |
| 2008/0072431 | A1 | 3/2008 | Ozenick |
| 2008/0128492 | A1 | 6/2008 | Roth et al. |
| 2008/0136811 | A1 * | 6/2008 | Adedayo .............. A45D 44/005 345/581 |
| 2008/0168657 | A1 * | 7/2008 | Cloke ................. B26B 21/4056 30/32 |
| 2008/0172882 | A1 | 7/2008 | Eger |
| 2008/0189953 | A1 | 8/2008 | Jessemey et al. |
| 2008/0209741 | A1 | 9/2008 | Chen et al. |
| 2009/0000126 | A1 | 1/2009 | Kraus |
| 2009/0056141 | A1 | 3/2009 | Barry et al. |
| 2009/0071008 | A1 | 3/2009 | Hart et al. |
| 2009/0119923 | A1 * | 5/2009 | Hart .................... B26B 21/4056 30/45 |
| 2010/0186234 | A1 | 7/2010 | Binder |
| 2010/0331765 | A1 | 12/2010 | Sullivan et al. |
| 2011/0289779 | A1 | 12/2011 | Volodin et al. |
| 2011/0314677 | A1 | 12/2011 | Meier et al. |
| 2012/0317817 | A1 | 12/2012 | Binder |
| 2013/0021460 | A1 | 1/2013 | Burdoucci |
| 2013/0067986 | A1 | 3/2013 | Girdler et al. |
| 2013/0250084 | A1 | 9/2013 | Binder |
| 2013/0250122 | A1 | 9/2013 | Binder |
| 2014/0123497 | A1 | 5/2014 | Zhuk et al. |
| 2014/0137883 | A1 | 5/2014 | Rothschild |
| 2014/0312135 | A1 | 10/2014 | Hyde et al. |
| 2015/0009312 | A1 | 1/2015 | Verna et al. |
| 2015/0051845 | A1 | 2/2015 | Alhashemi |
| 2015/0101196 | A1 | 4/2015 | Bolivar |
| 2015/0197016 | A1 | 7/2015 | Krenik |
| 2015/0352735 | A1 * | 12/2015 | Matthews ............. B26B 19/388 30/123 |
| 2016/0163180 | A1 * | 6/2016 | Chien .................. B26B 19/388 30/34.05 |
| 2016/0167241 | A1 | 6/2016 | Goldfarb et al. |
| 2016/0167242 | A1 | 6/2016 | Noh et al. |
| 2017/0066147 | A1 | 3/2017 | Ball et al. |
| 2017/0099199 | A1 | 4/2017 | Bauer et al. |
| 2017/0232624 | A1 | 8/2017 | King |
| 2018/0297226 | A1 | 10/2018 | Kim |
| 2018/0354147 | A1 | 12/2018 | Goldfarb et al. |
| 2019/0306259 | A1 | 10/2019 | Burghardt et al. |
| 2021/0308887 | A1 | 10/2021 | Goldfarb et al. |
| 2022/0005193 | A1 | 1/2022 | Robinson et al. |
| 2022/0005194 | A1 | 1/2022 | Knight et al. |
| 2022/0005195 | A1 | 1/2022 | Knight et al. |

(56) References Cited

U.S. PATENT DOCUMENTS

| | | | | |
|---|---|---|---|---|
| 2023/0032330 A1* | 2/2023 | Neyer | ................. | B26B 21/4056 |
| 2023/0211515 A1* | 7/2023 | Blatter | ............... | B26B 21/4056 |
| | | | | 30/41.7 |
| 2024/0269873 A1* | 8/2024 | Flinsenberg | ........ | B26B 21/4056 |
| 2024/0278444 A1 | 8/2024 | Goldfarb et al. | | |
| 2024/0359348 A1* | 10/2024 | Plat | .................... | B26B 21/4087 |
| 2025/0091235 A1* | 3/2025 | Good | ................. | B26B 21/4087 |
| 2025/0091236 A1* | 3/2025 | Good | ................. | B26B 21/4056 |
| 2025/0091237 A1* | 3/2025 | Good | ................. | B26B 21/4087 |
| 2025/0256415 A1* | 8/2025 | Kingma | ............. | B26B 21/4056 |

FOREIGN PATENT DOCUMENTS

| | | | | |
|---|---|---|---|---|
| WO | WO-2009076415 A2 * | 6/2009 | ......... | B26B 21/4056 |
| WO | WO-2016094327 A1 | 6/2016 | | |
| WO | WO-2018073693 A1 | 4/2018 | | |
| WO | WO-2018194347 A1 | 10/2018 | | |

OTHER PUBLICATIONS

International Search Report and Written Opinion received for PCT Patent Application No. PCT/US2015/064339, mailed on Apr. 1, 2016, 12 pages.
Invitation to Pay Additional Fees received for PCT Patent Application No. PCT/US2015/064339, mailed on Feb. 9, 2016, 2 pages.

* cited by examiner

FIG. 1F
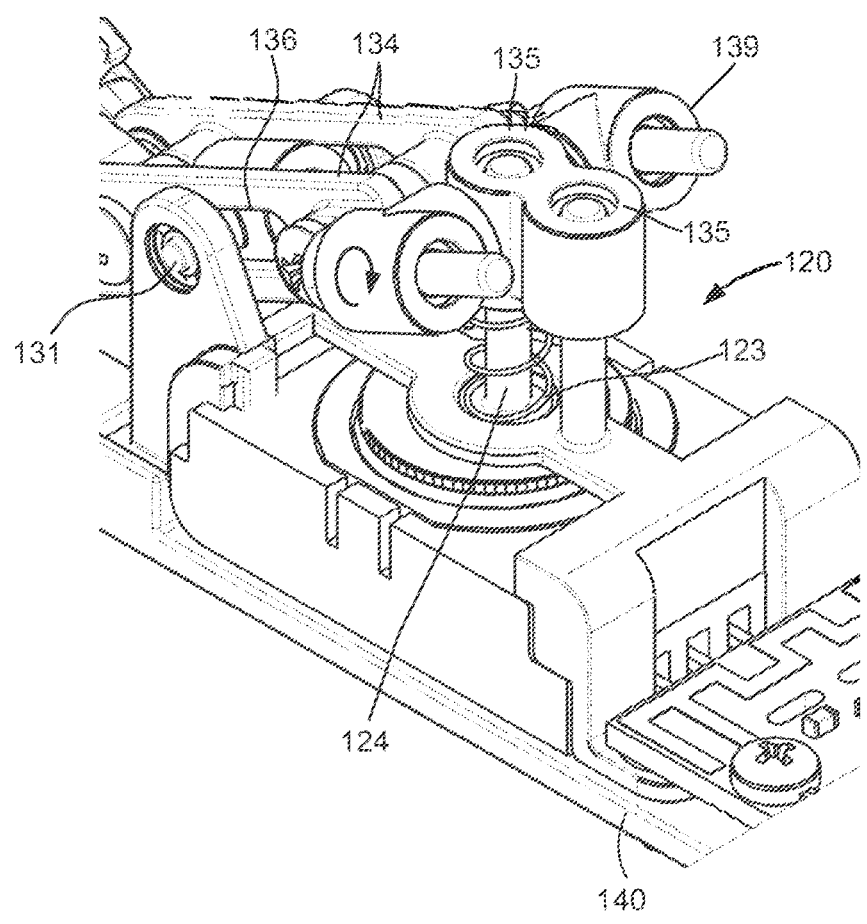
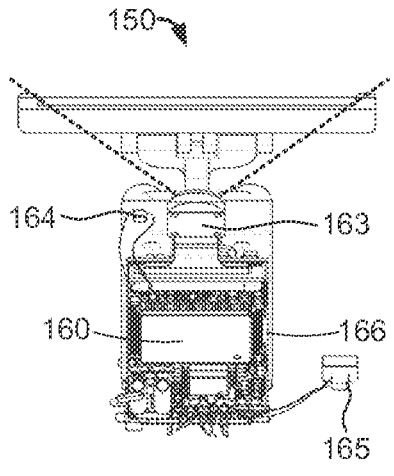
FIG. 1G
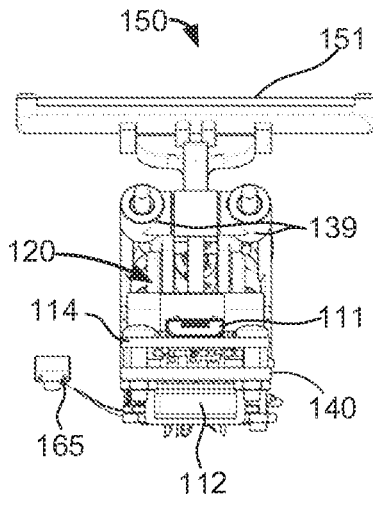
FIG. 1H

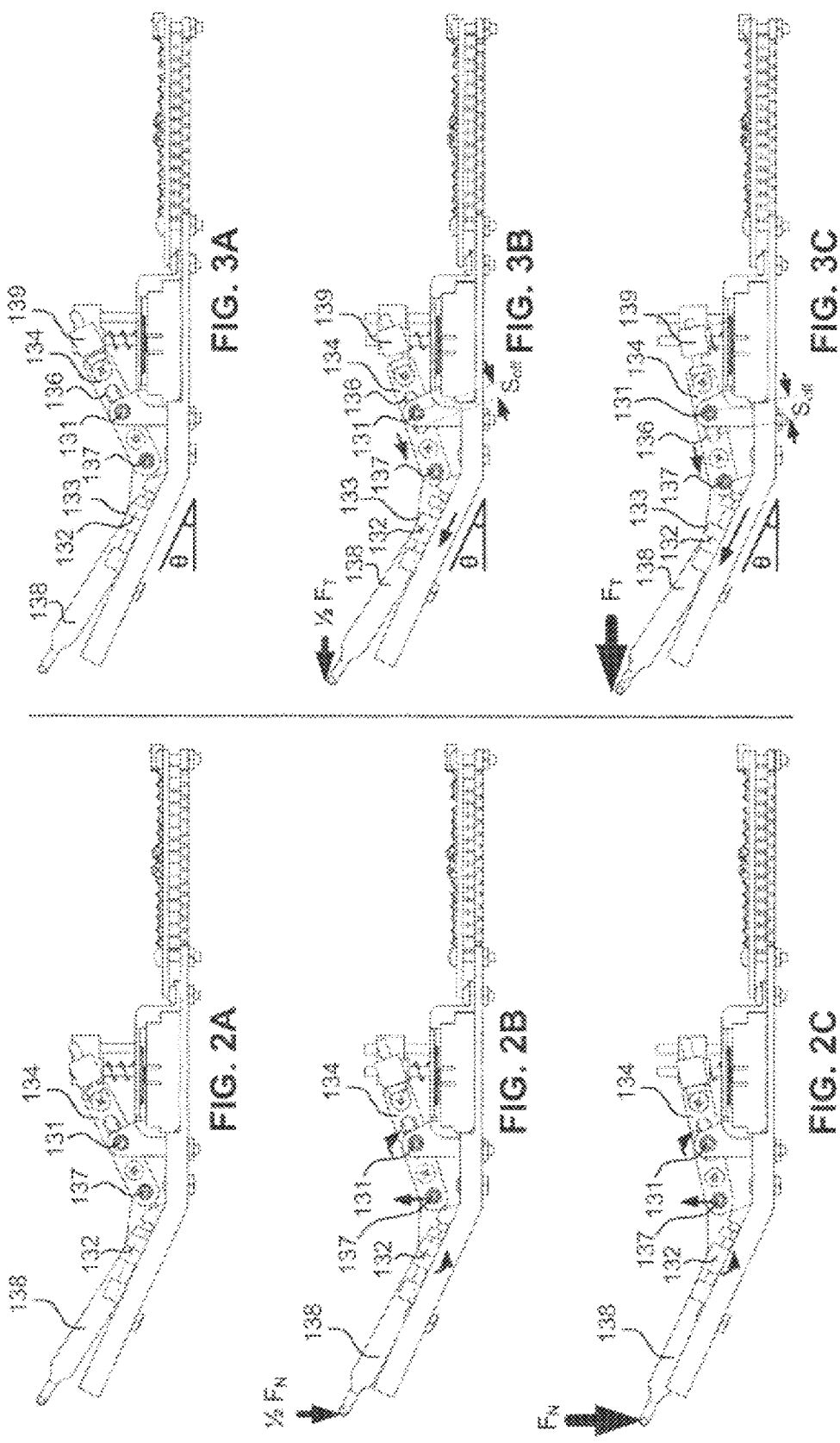

FIG. 11

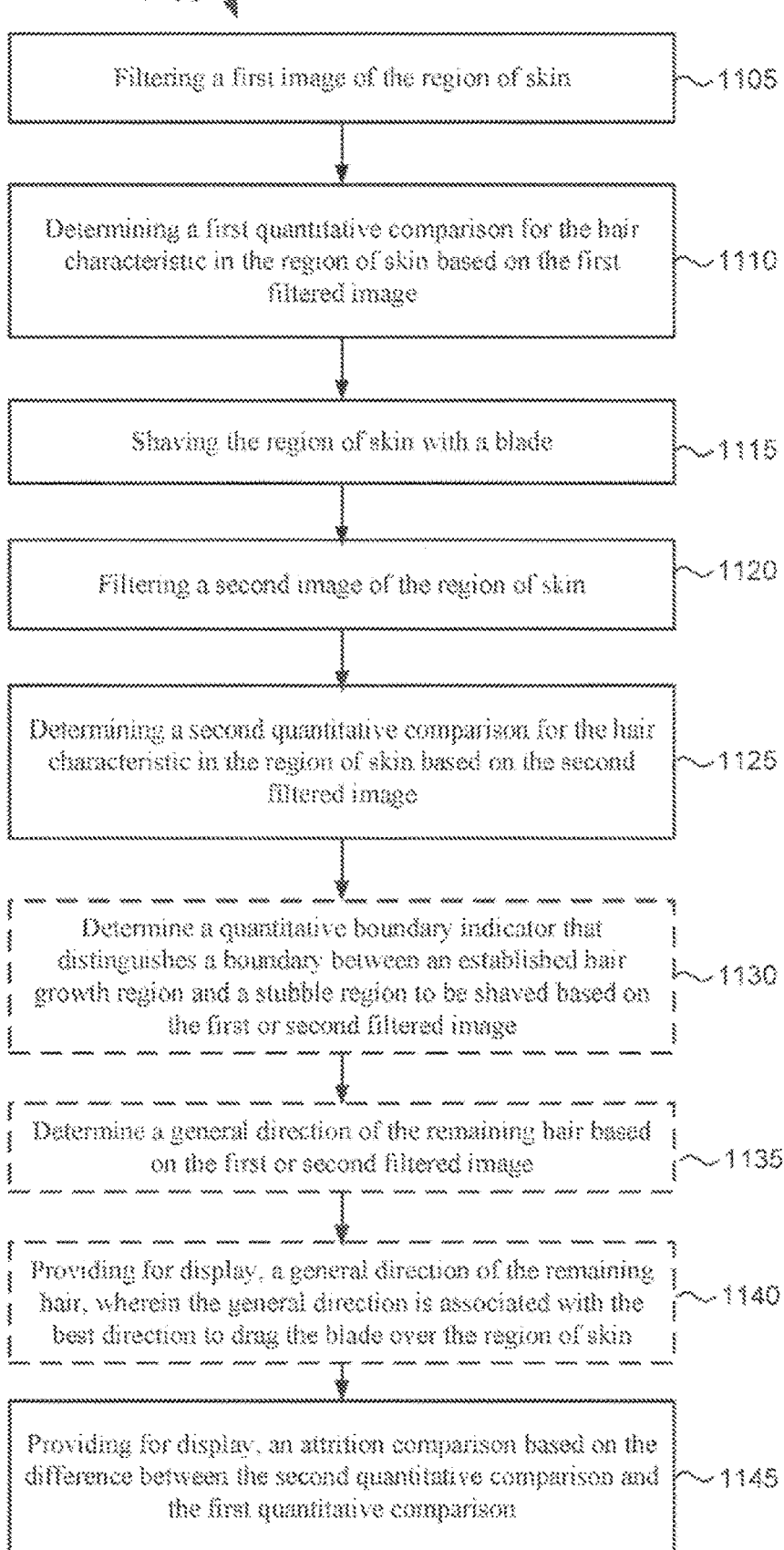

1100

Filtering a first image of the region of skin — 1105

Determining a first quantitative comparison for the hair characteristic in the region of skin based on the first filtered image — 1110

Shaving the region of skin with a blade — 1115

Filtering a second image of the region of skin — 1120

Determining a second quantitative comparison for the hair characteristic in the region of skin based on the second filtered image — 1125

Determine a quantitative boundary indicator that distinguishes a boundary between an established hair growth region and a stubble region to be shaved based on the first or second filtered image — 1130

Determine a general direction of the remaining hair based on the first or second filtered image — 1135

Providing for display, a general direction of the remaining hair, wherein the general direction is associated with the best direction to drag the blade over the region of skin — 1140

Providing for display, an attrition comparison based on the difference between the second quantitative comparison and the first quantitative comparison — 1145

INTELLIGENT SHAVING SYSTEM HAVING SENSORS

CLAIM OF PRIORITY

This application is a continuation of U.S. patent application Ser. No. 18/642,088, filed Apr. 22, 2024 and entitled "INTELLIGENT SHAVING SYSTEM HAVING SENSORS," which is a continuation of U.S. patent application Ser. No. 17/321,710, filed May 17, 2021 and entitled "INTELLIGENT SHAVING SYSTEM HAVING SENSORS," (now U.S. Pat. No. 11,964,405), which is a continuation of U.S. patent application Ser. No. 16/025,128, filed Jul. 2, 2018 and entitled "INTELLIGENT SHAVING SYSTEM HAVING SENSORS," (now U.S. Pat. No. 11,007,659), which is a continuation-in-part of U.S. patent application Ser. No. 14/961,842, filed Dec. 7, 2015 and entitled "INTELLIGENT SHAVING SYSTEM HAVING SENSORS," which claims priority to and the benefit of U.S. Provisional Patent Application No. 62/090,335, entitled "INTELLIGENT SHAVING SYSTEM HAVING SENSORS," filed Dec. 10, 2014, each of which is hereby incorporated by reference in its entirety.

BACKGROUND

1. Field

The present disclosure generally relates to the field of Internet of Things (IoT) and wirelessly connected intelligent devices and high precision hand tools, and, in particular, a shaving system to improve the shaving experience and quality of shave by providing the user with key information related to the blade and shaving in near real-time.

2. Description of Related Art

Proper shaving techniques facilitate a close and comfortable shave that avoid razor burn, razor bumps, and irritation. One approach to assist in shaving is to determine the correct positioning of a razor while shaving. This is often challenging, because in many instances many users are not able to clearly see the shaving region and must rely only on "feel" to determine the shave quality. In turn, this often leads to over-shaving, shaving "against the grain," or missed spots with patchy results. Likewise, these improper shaving techniques can lead to premature blade dulling and increased cost. Few razors have been developed to assist in proper shaving techniques. To date, the focus has been on razor designs that minimize the impact of poor shaving techniques.

BRIEF SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In some embodiments, a shaving system includes a handle; at least one blade connected to the handle; a microcontroller attached to the handle; and one or more sensors adjacent the at least one blade. The one or more sensors are configured to transmit sensory data to the microcontroller, and one of the one or more sensors is a proximity sensor.

In some embodiments, a shaving system includes a handle: at least one blade connected to the handle; a microcontroller attached to the handle; and one or more sensors adjacent the at least one blade. The one or more sensors are configured to send sensory data to the microcontroller, and one of the one or more sensors is a camera having an image sensor configured to capture video and/or still images.

In some embodiments, a razor cartridge includes a fixture configured to fasten to a razor; and at least one blade connected to the fixture. The at least one blade is curved.

In some embodiments, a blade includes a front leading edge of the blade: a spine of the blade; and a nanolattice that connects the front leading edge to the spine.

In some embodiments, a mountable electrical device includes a fixture configured to fasten to a precision hand tool; a microcontroller attached to the fixture; and a wireless communication unit attached to the fixture and electrically connected to the microcontroller. The wireless communication unit is configured to send and receive data from the microcontroller to an external device. The mountable electrical device further includes a memory electrically connected to the microcontroller. The memory is configured to store data from the microcontroller. The mountable electrical device further includes one or more sensors attached to the precision hand tool. The one or more sensors are configured to provide sensory data to the microcontroller.

In some embodiments, a method for determining blade attrition includes filtering, using an image device, a first image of a region of skin with hair; determining, using one or more processors, a first quantitative comparison for a hair characteristic in a region of skin based on the first filtered image; after the region of skin has been shaved, filtering, using one or more processors, a second image of the region of skin; determining, using one or more processors, a second quantitative comparison for the hair characteristic in the region of skin based on the second filtered image; and providing for display, a blade attrition comparison based on the difference between the second quantitative comparison and the first quantitative comparison.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description and not as a definition of the limits of the claims.

DESCRIPTION OF THE FIGURES

For a better understanding of the various described embodiments, reference should be made to the description below, in conjunction with the following figures in which like reference numerals refer to corresponding parts throughout the figures.

FIG. 1F illustrates an ISO view of a force sensor according to an embodiment of the present invention.

FIG. 1G illustrates a front view of shaving system with a force sensor and an image camera according to an embodiment of the present invention.

FIG. 1H illustrates a back view of shaving system with a force sensor and an image camera 163 according to an embodiment of the present invention.

FIGS. 2A-2C illustrate mechanical positions of a shaving system with a force sensor at zero insertion force, mid-range insertion force, and maximum insertion force applied normal to the skin, respectively, according to an embodiment of the present invention.

FIGS. 3A-3C illustrate positions of a shaving system with a force sensor at zero insertion force, mid-range insertion force, and maximum insertion force applied tangent to the skin, respectively, according to an embodiment of the present invention.

FIG. 11 is a flow diagram for gauging blade attrition according to an embodiment of the present invention.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown but are to be accorded the scope consistent with the claims.

As used herein, proximity sensor refers to a sensor that may be configured to detect how close blade 151 is to the skin. Proximity sensors may include physical contact sensors that are configured to detect the force applied between blade 151 and the skin as well as sensors that do not have a physical contact between blade 151 and the skin. Proximity sensors include, but are not limited to, IR sensors, ultrasonic rangefinders, and accelerometers.

Figure 12:
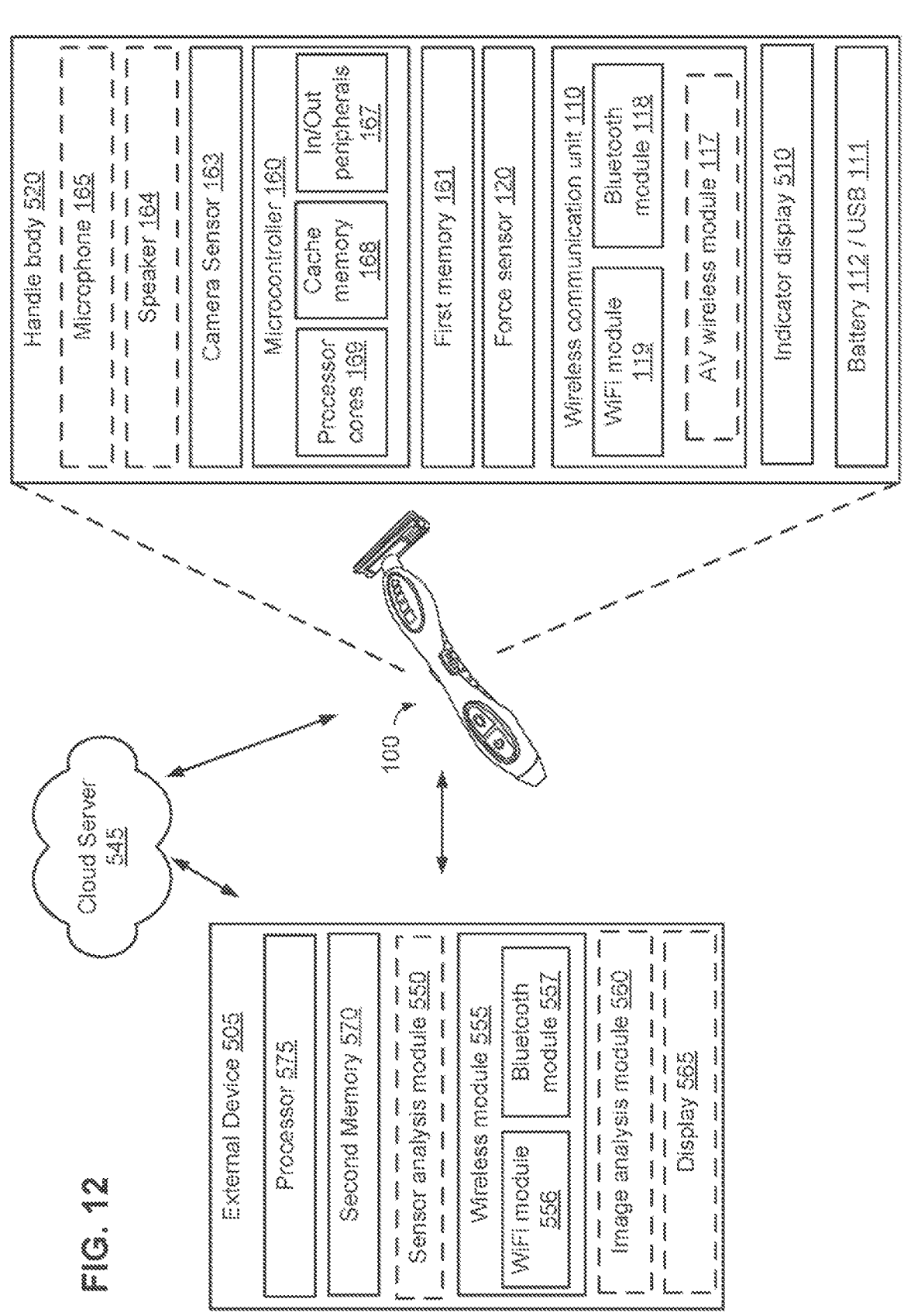
FIG. 12 illustrates electronic components and modules of shaving system in relation to an external device and a cloud server according to an embodiment of the present invention.

Various embodiments are described below, relating to intelligent shaving system 100 that communicates (e.g., wirelessly communicates) with external device 505. FIG. 12 illustrates electronic components and modules of shaving system 100 in relation to external device 505 and cloud server 545 in accordance with some embodiments of the present disclosure. It should be understood that although shaving system 100, external device 505, and cloud server 545 are shown, the embodiments described herein with respect to FIG. 12 are not limited to shaving system 100, external device 505, or cloud server 545.

Figure 4:
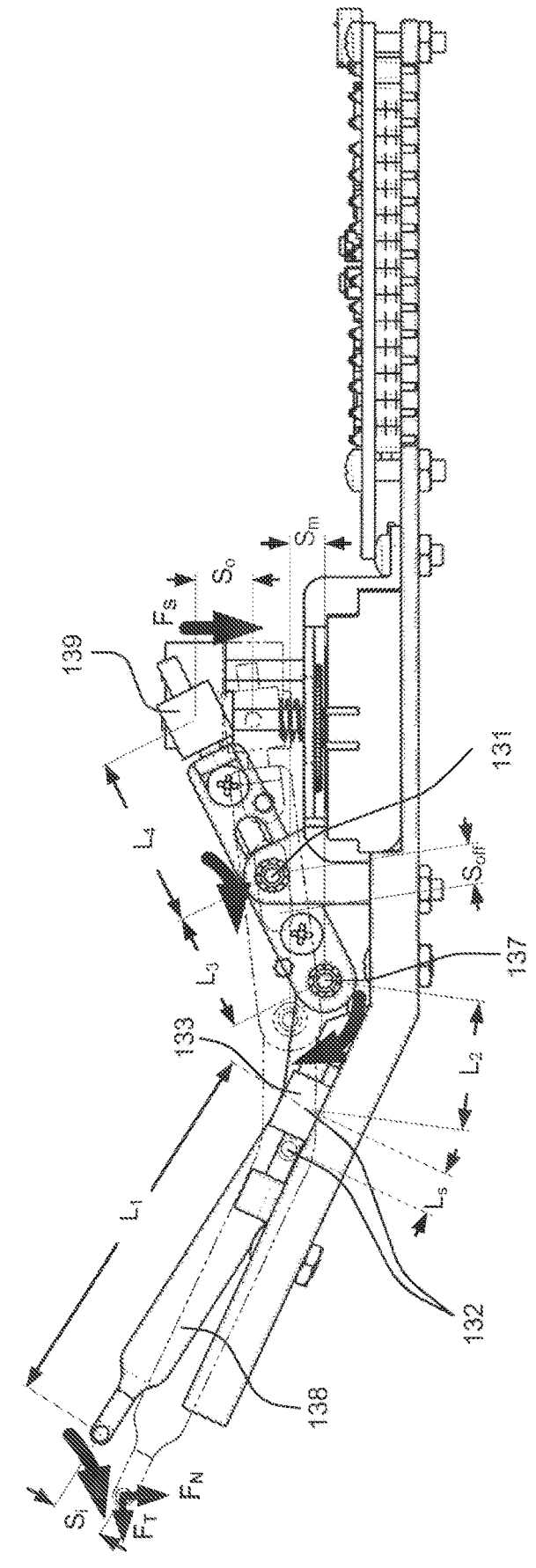
FIG. 4 illustrates the motion of a lever assembly from an initial position to a second position according to an embodiment of the present invention.
Figure 5:
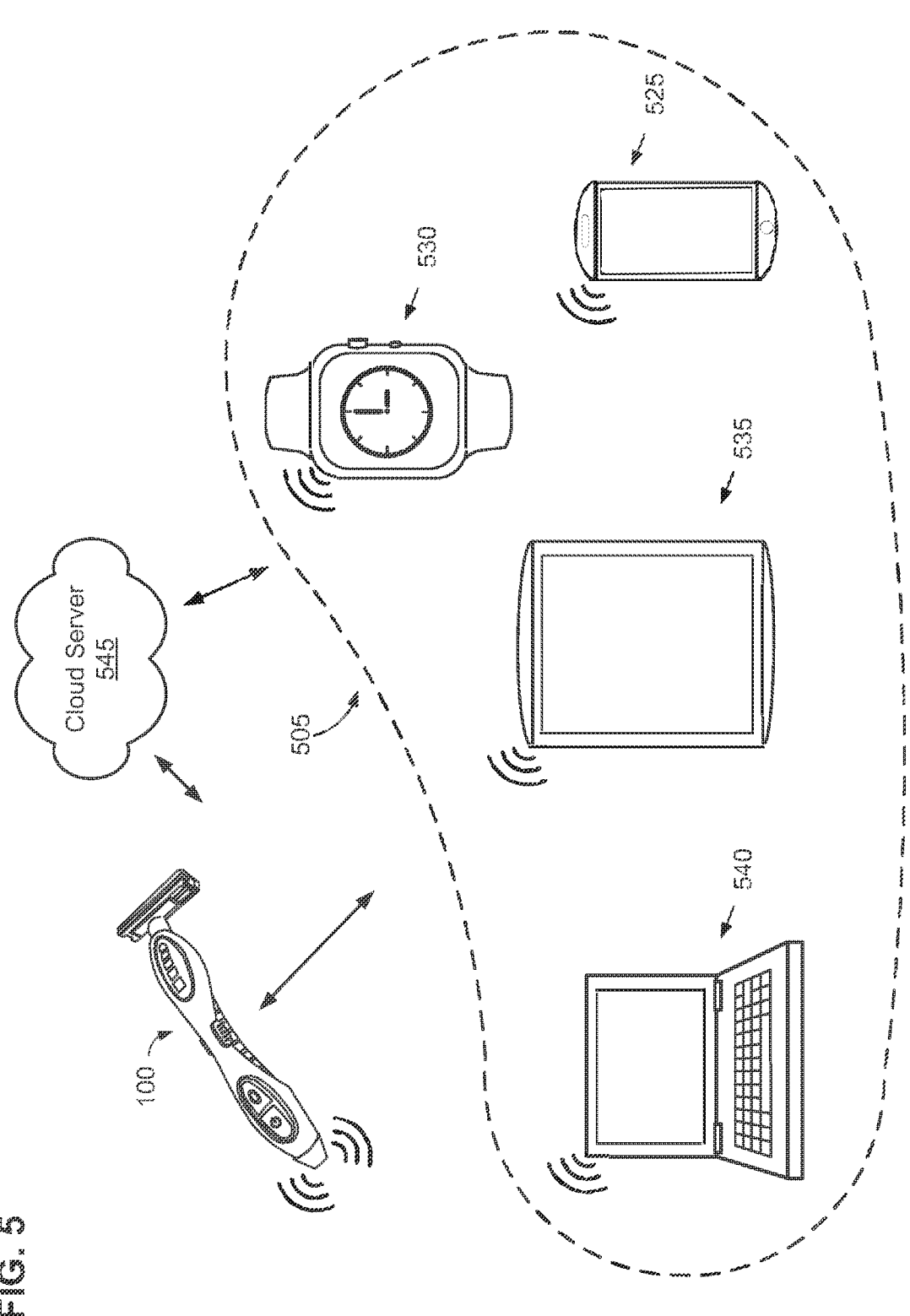
FIG. 5 illustrates connectivity between shaving system and external devices according to an embodiment of the present invention.
Figure 6:
FIG. 6 illustrates a shaving system with an image camera that streams video via a wireless communication unit to an external wristwatch according to an embodiment of the present invention.
Figure 7:
FIG. 7 illustrates a shaving system with an image camera that streams video via a wireless communication unit to a hand-held mobile phone or tablet according to an embodiment of the present invention.

As depicted in FIG. 12, the components included in shaving system 100 are encased within handle body 520, and as depicted in FIG. 5-FIG. 7, handle body 520 has an ergonomic shape that conforms according to a user's grip. In some embodiments, one or more components of the shaving system 100 are incorporated within handle body 520 and one or more components are configured to conform to handle body 520. For instance, speaker 164, microphone 165, and/or indicator display 510 (FIG. 5) are located externally on handle 140 of shaving system 100. In some examples, handle body 520 is configured to conform around USB connector 111 (FIG. 1A-FIG. 1H) to facilitate access for a mateable connector which provides power to charge battery 112 (FIG. 12) and/or access to media files (e.g., frame images, video) stored in first memory 161. It should be appreciated that shaving system 100 depicted in FIG. 1A-FIG. 4 may be adapted to conform to any known ergonomic form. In particular, the height of force sensor 120 (e.g., force cell, load cell) and lever assembly 130 may be reduced to accommodate a lower profile. In some examples, force sensor 120 may be implemented using a compression sensor.

As illustrated in FIG. 12, shaving system 100 includes within handle body 520 a microcontroller 160, which is an integrated circuit that embeds a processor core 169, cache memory 168, and programmable input/output peripherals 167 on an integrated circuit, as illustrated in FIG. 12. Microcontroller 160 may include additional embedded components to facilitate aspects of intelligent shaving system 100, such as portions of wireless communication unit 110, an audio/video (AV) wireless module 117, a video transmitter/broadcaster, a video encoder/decoder (e.g., video compressor), an audio encoder/decoder (e.g., audio compressor), an encryption unit, a timer, and the like.

In general, microcontroller 160 is configured to electrically interface with sensors, specifically, camera sensor 163, force sensor 120, and microphone 165. Microcontroller 160 is also configured to facilitate interaction with a user by providing audio and/or visual feedback to the user during a shave session. In particular, shaving system 100 includes on handle body 520, speaker 164 and indicator display 510 (the speaker 164 and the indicator display 510 being examples of a feedback indicator). In some embodiments, shaving system 100 includes on handle body 520, user interaction switches 515 (e.g., power switch, selection switch) to select various features on shaving system 100.

Shaving system 100 includes first memory 161 electrically connected to microcontroller 160. In some embodiments, the first memory 161 is configured to store data associated with at least one blade 151. In particular, first memory 161 is configured to store data and/or information to facilitate the interaction between microcontroller 160 and electrically connected sensors (e.g., camera sensor 163, force sensor 120). In some embodiments, first memory 161 is non-volatile memory, such as and/or configured to buffer sensory data between one or more sensors and wireless communication unit 110.

Shaving system 100 includes wireless communication unit 110 that is configured to communicate with external devices 505. Wireless communication unit 110 includes WiFi module 119 and Bluetooth module 118. In some embodiments, wireless communication unit 110 includes an audio/video wireless module 117 that is configured to facilitate transmitting audio/video data between shaving system 100 and one or more external devices, in some instances, wireless communication unit 110 interfaces with cloud server 545 via a router or an internet gateway.

As illustrated in FIG. 12, external device 505 includes wireless modules 555 to interface to wireless communication unit 110 of shaving system 100. Wireless module 555 includes WiFi modules 556 and Bluetooth module 557. It will be appreciated that external device 505 and shaving system 100 are not limited to WiFi protocols or Bluetooth protocols and may operate in accordance with one or more other wireless protocols.

To conserve resources, microcontroller 160 may offload sensory data to external device 505. Accordingly, in some examples, microcontroller 160 is configured to transmit sensory data via wireless communication unit 110 to wireless module 555 on external device 505. As such, external device 505 includes sensor analysis module 550 and image analysis module 560 to determine one or more quantitative results. External device includes one or more processors 575 as well as secondary memory 570 that may be volatile or non-volatile. In some embodiments, external device may display on display 565 streamed image frames and/or quantitative indicators. In some instances, display 565 is a touch screen configured to interface with a user with selectable software buttons or switches.

1. Shaving System 100 with Proximity Sensor

Shaving system 100 includes a cartridge-razor body style with blade cartridge 150 and handle 140, that is equipped with one or more sensors configured to capture sensory data (e.g., force, proximity or contact, image, friction, temperature, motion) and send the sensory data to one or more onboard microcontrollers 160. In general, microcontroller 160 is configured to receive, process, and/or store the sensory data (e.g., force, proximity or contact, image, friction, temperature, motion) to first memory 161. In some instances, the microcontroller 160 is configured to transmit sensory data (e.g., force, proximity or contact, image, friction, temperature, motion) or processed data (e.g., video stream, sensory data) to external device 505 associated with a user.

Proximity sensors, as described herein, may be configured to detect the nearness of a target from the sensor. As used herein, proximity sensors include not only sensors used to detect how close a blade 151 is to the skin, but also sensors such as physical contact sensors configured to detect the force applied between blade 151 and the skin and sensors that do not require physical contact between blade 151 and skin, such as accelerometers.

As depicted in FIG. 5, shaving system 100 may include wireless communication unit 110 configured to interface with external device 505 to provide useful shaving information and improve the shaving experience. In some embodiments, an external device 505 is a wearable computing device (e.g., watch 530). In some embodiments, an external device 505 is a hand-held phone 525, tablet 535, laptop, or desktop 540. In general, wireless communication unit 110 is configured to consume low-power and is configured for full duplex operation for transmitting (TX) and receiving (RX) simultaneously.

Communication unit 110 includes both Bluetooth and WiFi protocols and either may be configured to stream video data from camera 163 and/or audio data from microphone 165. For WiFi 119, wireless communication unit 110 is configured to use IEEE 802.11 protocols for implementing wireless local area network (WLAN) computer communication in the 2.4, 3.6, 5, and 60 GHz frequencies. For Bluetooth 118, wireless communication unit 110 is configured in accordance with IEEE 802.15 protocols. In some instances, external device 505 includes a built-in WiFi module 556 or Bluetooth module 557 (FIG. 12) that connects to wireless module 555 to facilitate the wireless interface. It should be understood that, although wireless communication unit 110 and wireless module 555 (FIG. 12) include WiFi and Bluetooth protocols (e.g., IEEE 802.15), the embodiments described herein with respect to the figures are not limited to wireless communication unit 110 and/or any protocols or frequencies described herein.

Figure 1A:
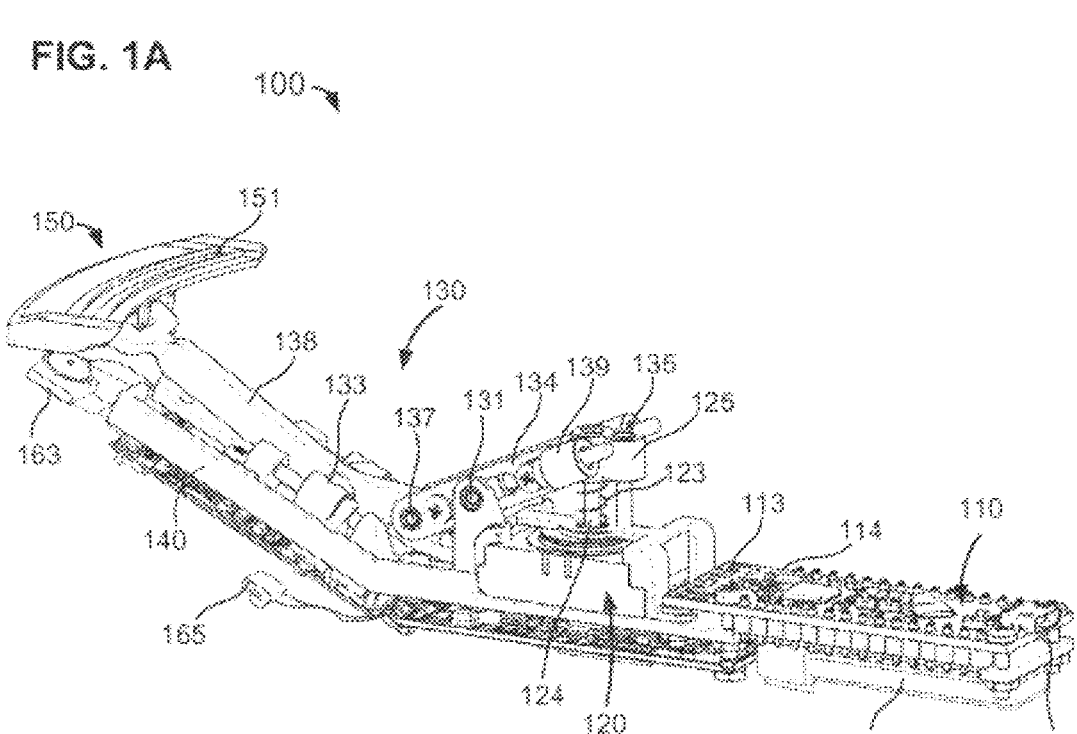
FIG. 1A illustrates a back ISO view of shaving system with a force sensor and an image camera according to an embodiment of the present invention.
Figure 1B:
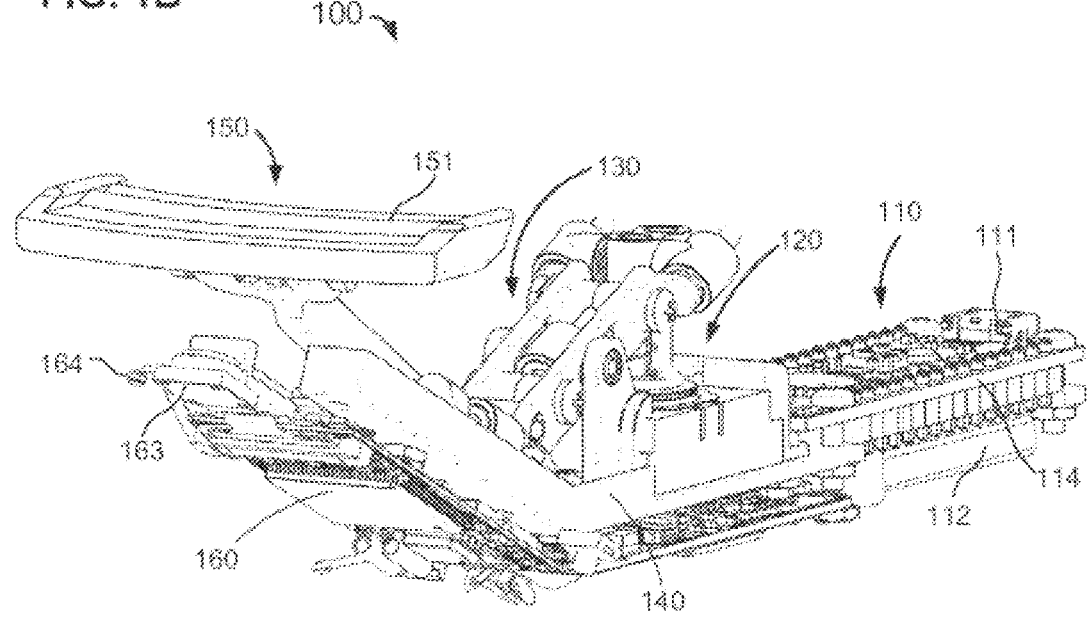
FIG. 1B illustrates a front ISO view of shaving system with a force sensor and an image camera according to an embodiment of the present invention.
Figure 1C:
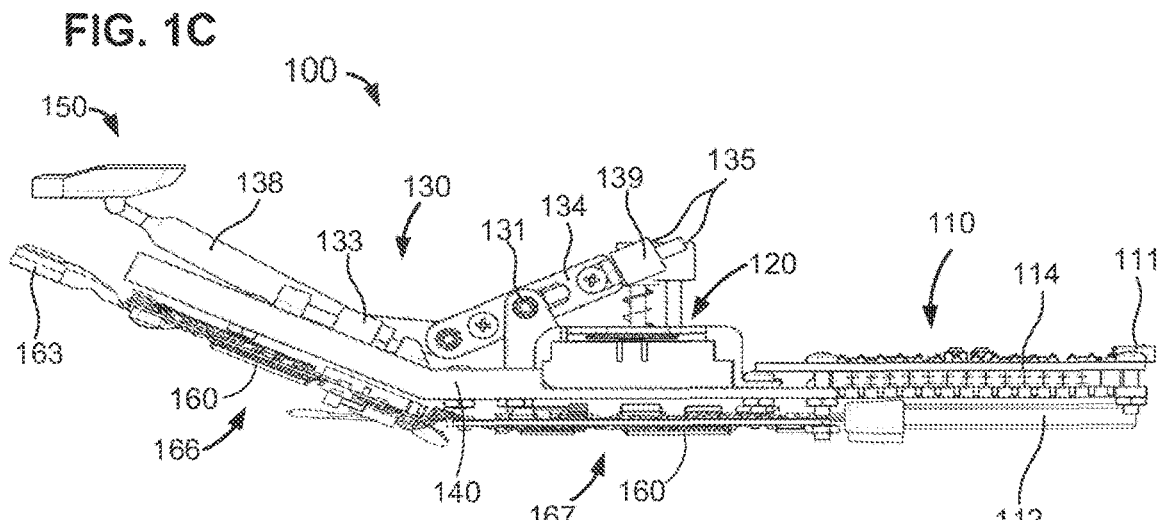
FIG. 1C illustrates a side view of a shaving system with a force sensor and an image camera according to an embodiment of the present invention.
Figure 1D:
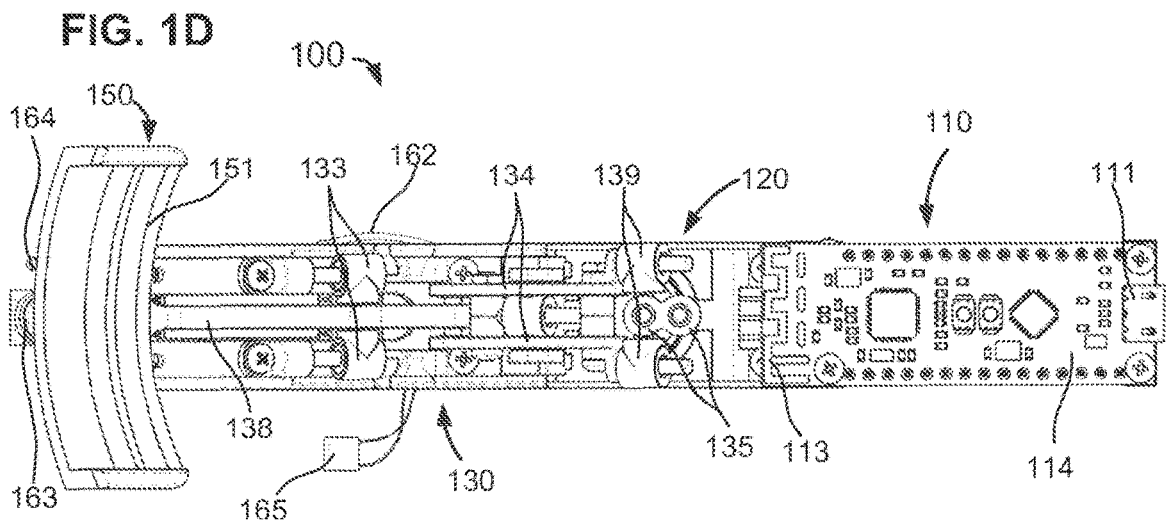
FIG. 1D illustrates a bottom view of a shaving system with a force sensor and an image camera according to an embodiment of the present invention.
Figure 1E:
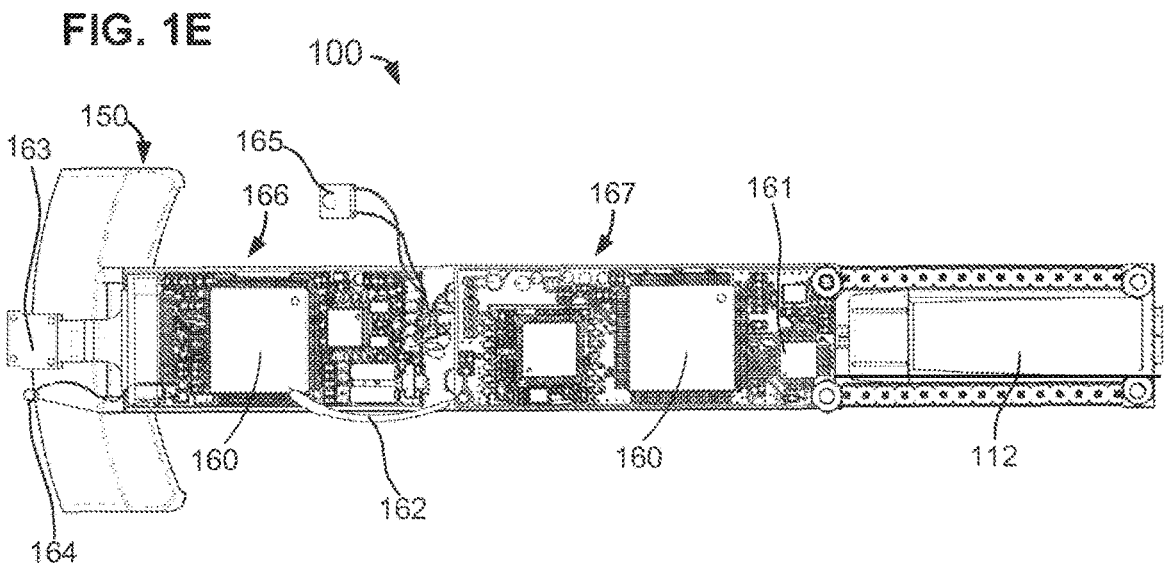
FIG. 1E illustrates a top view of shaving system with a force sensor and an image camera according to an embodiment of the present invention.

Aspects of wireless communication unit 110 may be separated across multiple locations and/or multiple printed circuit boards (PCBs). For example, as depicted in FIG. 1E. WiFi module 119 and WiFi antenna 162 are disposed close to microcontroller 160 on camera PCB 166 and audio/video PCB 167 rather than on communication PCB 114. This configuration facilitates low voltage operation, which assists to reduce the power consumption. In some instances, wireless communication unit 110 is embedded in microcontroller 160. In contrast, as depicted in FIGS. 1A and 1E, Bluetooth module 118 and Bluetooth antenna 113 are integrated with wireless communication unit 110 on communication PCB 114. In some instances, the Bluetooth module 118 is configured to transmit media information (e.g., streamed capture frames of the images) from video camera 163. In some embodiments, shaving system 10M includes wireless communication unit 110, which is attached to handle 140 and is electrically connected to microcontroller 160. In some instances, wireless communication unit 110 is configured to transmit and receive data between microcontroller 160 to wireless module 555 on external device 505 (e.g., FIG. 5 and FIG. 12).

As depicted in FIG. 1A-FIG. 4, shaving system 100 includes force sensor 120 (e.g., force cell, load cell) coupled to lever assembly 130. Lever assembly 130 hinges blade cartridge 150 around first fulcrum 131 and second fulcrum 132 to depress plunger 124 over a distance So. In some instances, spring 123 is used to determine sensor force, $F_s$, at plunger by multiplying plunger depression distance $S_o$ with the stiffness, k, of spring 123 (e.g., $F_s$=k·So). Various techniques may be used to determine plunger depression distance So. For instance, in some embodiments, plunger 124 is connected to a terminal of a slider potentiometer or a variable resistor and configured to provide a resistance or voltage proportional to plunger depression distance So.

In some embodiments, force sensor 120 (e.g., force cell, load cell) includes a capacitor plate configured to provide a capacitance proportional to plunger depression distance So. In some embodiments, force sensor 120 is a load-cell that includes micro-machined silicon piezo-resistive strain gauges fused with high temperature glass to a high performance stainless steel substrate. It should be appreciated that shaving system 100 is not limited to force sensor 120 and may include, for example, an accelerometer configured to calculate a number of shave strokes and their intensity, a piezoelectric material (e.g., quartz) sensor, or other capacitive-based sensor configured to provide an electric charge proportional to the force, $F_s$, at plunger 124.

Force sensor 120 may be configured to sense composite force, F, that includes both normal force, FN, and tangential force, FT. Normal force, FN, refers to the force a user applies to press blade cartridge 150 against the surface of the skin. As illustrated in FIGS. 2A-2C, shaving system 100 includes lever assembly 130 to detect normal force, FN. In this instance, lever assembly 130 is configured to translate (e.g., transfer) normal force, FN, to depress plunger 124 of force sensor 120. That is, applying normal force, FN, to the tip of input arm 138, pivots coupling 137 around second fulcrum 132, which in turn pivots output arm 134 around second fulcrum 132 to depress plunger 124. In some embodiments, the positions of first fulcrum 131 and second fulcrum 132 remain fixed and do not readjust with the application of a normal force. FN. For instance, first fulcrum 131 and second fulcrum 132 depicted in FIG. 2B and FIG. 2C, maintain the same initial position from FIG. 2A with the application of a normal force, $\frac{1}{2}$ $F_N$ and FN, respectively. In some embodiments the positions of one or both of first fulcrum 131 or second fulcrum 132 is adjusted with the application of a normal force. FN.

The displacement at the tip of input arm 138 (e.g., input displacement distance) is proportional to the applied normal force, FN. That is, the displacement distance Si of input arm 138 is zero without any applied normal force, FN, as illustrated in FIG. 2A. FIG. 2B and FIG. 2C illustrate increasing displacement distance Si of input arm 138 with the application of normal forces, $\frac{1}{2}$ $F_N$ and FN, respectively.

As illustrated in FIG. 2A-FIG. 4, the forward kinematics of the displacement distance. Si, translates to a counterclockwise rotational motion of input arm 138 about second fulcrum 132 that displaces coupling 137 a distance, Sm. The displacement of coupling 137, Sm, translates to a clockwise rotational motion of output arm 134 about first fulcrum 131 that displaces plunger 124 a distance, So.

As illustrated in FIG. 4, precise displacement distance of coupling 137, Sm, with respect to the input displacement, Si, is based on a ratio of the distance from the tip of input arm 138 to second fulcrum 132, L1, and the distance from second fulcrum 132 to the center of coupling 137, $L_2$, or $$\frac{S_i}{S_m} = \frac{L_1}{L_2} \tag{1}$$

Similarly, the displacement distance of plunger 124 (e.g., output displacement), So, with respect to the displacement distance of coupling 137, Sm, is based on a ratio of the distance from the center of coupling 137 to first fulcrum 131, L3, and the distance from first fulcrum 131 to plunger 124, L4, or $$\frac{S_m}{S_o} = \frac{L_3}{L_4} \tag{2}$$

The overall displacement ratio of the displacement distance of plunger 124 (e.g. output displacement), So, with respect to the displacement at the tip of input arm 138 (e.g., input displacement distance), Si, is based on the distance from the tip of input arm 138 to second fulcrum 132, L1 times the distance from the center of coupling 137 to first fulcrum 131, $L_3$ divided by the distance from second fulcrum 132 to the center of coupling 137, $L_2$, and divided by the distance from first fulcrum 131 to plunger 124, L4, or $$\frac{S_i}{S_o} = \frac{L_1}{L_2} \times \frac{L_3}{L_4} \tag{3}$$

Accordingly, the lever assembly 130 of shaving system 100 can tune the transference ratio based on the distance from the tip of input arm 138 to second fulcrum 132. L1, the distance from the center of coupling 137 to first fulcrum 131, $L_3$, the distance from second fulcrum 132 to the center of coupling 137, $L_2$, and the distance from first fulcrum 131 to plunger 124, L4. Tuning the transference ratio provides a sensing range that is conducive to the force sensor 120 operating range.

In some embodiments, lever assembly 130 is configured to displace plunger 124 (e.g., output displacement), So, the same distance as the tip of input arm 138 (e.g., input displacement distance), Si, which results in a one-to-one transference ratio (e.g., $F_s$=FN. Si=So)). In some embodiments, lever assembly 130 is configured to displace plunger 124 (e.g., output displacement), So, less than the displacement distance of the tip of input arm 138 (e.g., input displacement distance), Si, which results in a transference ratio greater than one (e.g., $F_s$<FN, Si<So). In some embodiments, lever assembly 130 is configured to displace plunger 124 (e.g., output displacement). So, more than the displacement distance of the tip of input arm 138 (e.g., input displacement distance), Si, which results in a transference ratio less than 1 (e.g., $F_s$>FN, So>Si).

One benefit of a transference ratio larger than one (e.g., $F_s$>FN, Si>So) is that the displacement distance of plunger 124 (e.g., output displacement), So, is larger than the displacement at the tip of input arm 138 (e.g., input displacement distance), Si, which results in a force sensor 120 with a higher resolution.

Relating the overall displacement ratio of the displacement at the tip of input an 138 (e.g., input displacement distance), Si, with respect to the displacement distance of plunger 124 (e.g., output displacement), So, is proportional to sensing force $F_s$ with respect to normal force, FN. In view of Equation (3) above, sensing force. $F_s$, with respect to normal force, FN, is based on the distance from the tip of input arm 138 to second fulcrum 132, L1, times the distance from the center of coupling 137 to first fulcrum 131, L3, divided by the distance from second fulcrum 132 to the center of coupling 137, $L_2$, and divided by the distance from first fulcrum 131 to plunger 124, L4, or $$\frac{F_S}{F_N} = \frac{S_i}{S_o} = \frac{L_1}{L_2} \times \frac{L_3}{L_4} \qquad (4)$$

That is, normal force, FN, is multiplied by the transference ratio to calculate sensing force, $F_s$. Likewise, displacement distance of plunger 124, So, is multiplied by the transference ratio to calculate the displacement at the tip of input arm 138. Si.

Tangential force, FT, is part of composite force, F, that refers to the force a user applies to blade cartridge 150 to cut hair across the surface of the skin, and is based, at least in part, on friction due to the blade 151 dragging on the surface of the skin. In general, lever assembly 130 is configured to translate (e.g., transfer) tangential force, FT, to depress plunger 124 of force sensor 120. In this instance, second fulcrum 132 is coupled to second slide bearing 133, which is configured to move along an inclined plane at angle θ, with respect to the gripping portion of handle 140. Applying tangential force, FT, to the tip of input arm 138 slides second fulcrum 132 up the inclined plane at angle θ to reposition coupling 137. In turn, coupling 137 readjusts the position of output arm 134 along a channel within output arm 134 and first slide bearing 139 while coupling 137 pivots around first fulcrum 131 to depress plunger 124.

As illustrated in FIG. 3A-3C, the position of second fulcrum 132 remains the same with respect to input arm 138, whereas the position of first fulcrum 131 is adjusted based on applied tangential force, FT. As such, the distance from the center of coupling 137 to first fulcrum 131, L3, and the distance from first fulcrum 131 to plunger 124, L4, varies over the distance of the channel within output arm 134. This variance in the distance from the center of coupling 137 to first fulcrum 131. L3, and the distance from first fulcrum 131 to plunger 124, L4, varies the transference ratio.

To compensate for this variance, position sensor 136, which in some examples includes a slide bearing, is placed along the channel within output arm 134 to provide offset from the initial position depicted in FIG. 3A. In this instance, position sensor 136 is a variable sliding resistor configured to provide a resistance or voltage proportional to the offset sliding distance, Soff. In some embodiments, position sensor 136 may include other sensors such as a capacitive transducer, a capacitive displacement sensor, an eddy-current sensor, an ultrasonic sensor, a grating sensor, a hall effect sensor, an inductive non-contact sensor, an optical sensor (e.g., laser doppler vibrometer), a linear variable differential transformer (LVDT), a multi-axis displacement transducer, a photodiode array, a piezo-electric transducer, a rotary encoder, or the like.

As illustrated in FIG. 3A, the sliding motion of input arm 138 is zero without any applied tangential force, FT, whereas, as illustrated in FIG. 3B and FIG. 3C, sliding motion of plunger 124 is increased with offset sliding distance, Soft, of position sensor 136 with the application of tangential forces, ½ $F_N$ and FN, respectively. The inverse kinematics translates the sliding motion of position sensor 136 at second fulcrum 132 along an inclined plane to a clockwise rotational motion of output arm 134 about first fulcrum 131 to displace plunger 124 distance So. That is, tangential force, FT, is proportional to a combination of offset sliding distance, Soff, and the displace distance of plunger 124, So. In some examples, microcontroller 160 is configured to determine the applied tangential force, FT, based on both the displace distance of plunger 124, So, and the offset of position sensor 136.

To facilitate the slide motion along the inclined plane, slide bearing 139, slide bearing 133, slide bearing/position sensor 136, and vertical slide bearings 135 mounted over plunger 124 are configured to have mechanical properties of near zero friction (e.g., frictionless). In some instances, slide bearing 139 and second slide bearing 133 include ball bearings. In some instances, slide bearing 139 and second slide bearing 133 include linear bearings. In some instances, slide bearing 139 and second slide bearing 133 include both ball bearings and linear bearings.

As illustrated in FIG. 4, lever assembly 130 and force sensor 120 are configured to combine normal force, FN, and tangential force, FT, into single quantitative indicator 510 that is associated with the total force applied to the skin. In some embodiments, lever assembly 103 is configured to transfer both normal force. FN, and tangential force, FT, form blade 151 in contact with the skin to the compressive force at the proximity sensor.

By having lever assembly 130 and force sensor 120 (e.g., force cell, load cell) configured to combine normal force, FN, and tangential force, FT, into single quantitative indicator 510, lever assembly 130 and spring 123 cushion and absorb sudden movements. This provides for blade 151 to follow along the surface contour of the skin and conform across imperfections (e.g., micro bumps) for a closer, more comfortable shave. In some embodiments, lever assembly 130 and force sensor 120 (e.g., force cell, load cell) include a dashpot configured to reduce vibrations in the spring 123 as well as slow the travel of lever assembly 130 to the initial position depicted in FIG. 2A and FIG. 3A. In some instances, the dashpot includes pneumatics.

Further, by having lever assembly 130 and force sensor 120 (e.g., force cell, load cell) configured to combine normal force, FN, and tangential force. FT, into single quantitative indicator 510, lever assembly 130 and spring 123 can compensate for rough motions of the user's arm or hand thereby minimizing the pressure of blade 151 against the skin.

It should be appreciated that shaving system 100 is not limited to lever assembly 130 or force sensor 120 to detect one or both of normal force, FN, or tangential force, FT. For example, strain sensors (e.g., piezo-electric sensors) may be disposed between blade 151 and the body of blade cartridge 150. In this instance, one or more strain sensors (e.g., piezo-electric sensors) may be configured to sense normal force, FN, and/or tangential force, FT, that can be combined into single quantitative indicator 510.

Some embodiments of shaving system 100 display quantitative force indicator 510 on handle 140 of shaving system 100 or alternatively on external device 505 (e.g., smartphone 525, tablet 535, laptop, or desktop 540) via wireless communication unit 110 to wireless module 555. In some instances, microcontroller 160 stores to first memory 161 data indicative of the force applied (e.g., the force over a shave session) prior to blade cartridge 150 replacement. This provides a reference for a 'dull' blade 151 and provides another indicator to facilitate predicting blade attrition and end of life of blade cartridges 150.

In some embodiments, microcontroller 160 is configured to store in first memory 161 the data indicative of the force applied between a new blade cartridge 150 and the skin during the first shaving session. This beneficially can be used as a baseline for a 'sharp blade' for subsequent shaving sessions.

In some embodiments, microcontroller 160 or the external device is configured to calculate a force applied over several shaving sessions (e.g., 'habitual' average force). Tracking the force applied in this manner provides a metric to gauge blade attrition (e.g., dulling of blade 151). For example, the force a user applies using a new 'sharp' blade 151 may be equal to ½ FN, which displaces lever assembly as depicted in FIG. 2B. In contrast, the average force a user applies using an older 'dull' blade 151 may be equal to FN, which displaces lever assembly 130 twice as far as depicted in FIG. 2C. In this instance, the additional force against the skin a user applies to compensate for the additional friction of inefficiencies of 'dull' blade 151 is twice as much as 'sharp' blade 151.

In some instances, microcontroller 160 or the external device is configured to count the number of shaving strokes, which in this instance is the number of times in a shaving session that an applied force exceeds the calculated average force applied over several shaving sessions. Contrasting the number of shaving strokes provides another metric to gauge blade attrition (e.g., dulling of blade 151). For example, the number of shaving strokes for new 'sharp' blade 151 is often significantly less than the number of shaving strokes for older 'dull' blade 151, because a user will drag 'dull' blade 151 across the skin more times to account for less efficient cutting. As such, the number of shaving strokes increase as the blade dulls, which provides a metric to gauge blade attrition.

In some instances, microcontroller 160 or the external device incorporates machine learning (e.g., heuristics) to determine blade attrition based on the number of strokes. For example, shaving system 100 may include a threshold associated with a number of shaving strokes for 'dull' blade 151. Microcontroller 160 or the external device adjusts the threshold associated with a number of shaving strokes for 'dull' blade 151 each time a user replaces blade 151. Over time, the threshold associated with a number of shaving strokes for 'dull' blade 151 converges on an accurate value that is based on a user's comfort level for blade cartridge 150 replacements. In some instances, microcontroller 160 is configured to prompt the user when the number of shaving strokes for 'dull' blade 151 approaches the adjusted threshold level. For example, external device 505 may be configured to prompt the user once the number of shaving strokes exceeds 90% of the threshold associated with number of shaving strokes for 'dull' blade 151. In some instances, a pop-up is displayed that facilitates the user to order a new replacement blade online. In some instances, replacement blades are automatically ordered for a user.

As depicted in FIG. 1A-FIG. 4. force sensor is configured as a proximity sensor that detects contact between each blade 151 and the skin. In some instances, force sensor 120 is configured to indicate contact between blade cartridge 150 and the skin for any depression distance So greater than zero (e.g., x>0). Likewise, in some instances, force sensor 120 may be configured to indicate contact based on changes in force, F, over a time differential, Δt. which can provide feedback to a user (e.g., audible sound, light or message displayed on an external device (the external device being an example of a feedback indicator)) to assist in shaving.

In some embodiments, lever assembly 130 includes a stopper configured to reduce the travel distance of lever assembly 130. The stopper may be set at various positions of known deflection that are used to calibrate force sensor 120. In some instances, a stopper is set in a position that indicates a force threshold of 'dull' blade 151.

In some embodiments, proximity sensor is a touch based sensor (e.g., piezoelectric sensor, capacitive sensor) attached to each blade 151 on blade cartridge 150 configured to detect contact of each blade 151 with the skin. In some instances, blade 151 is in contact with the skin and the proximity sensor is configured to detect a compressive force. In some instances, proximity sensor is attached to the front of blade cartridge 150 adjacent to blades 151 that are configured to detect contact between blade cartridge 150 and the skin.

It will be appreciated that shaving system 100 is not meant to be limited to force sensor 120. For instance, conceivable modifications to lever assembly 130 may hinge blade cartridge 150 around fulcrum 131 to extend plunger 124 over a negative distance, –So. In this instance, spring 123 of force sensor 120 is configured to detect a tensile force rather than a compressive force. For example, in some embodiments, blade 151 is in contact with the skin and the proximity sensor is configured to detect a tensile force. In some embodiments, lever assembly 103 is configured to transfer both normal force, FN, and tangential force, FT, form blade 151 in contact with the skin to the tensile force at the proximity sensor. Other contact based proximity sensors configured to detect the force blade 151 exerts on the skin include piezoelectric sensors, capacitive sensors, micro-electrical mechanical system (M EMS) based sensors, and the like.

In some embodiments, the proximity sensor is an ultra-sonic rangefinder. For example, in some instances, this includes a distance ranging mechanism such as an ultrasonic pulse rangefinder configured to determine the distance from blade 151 to the skin. In some embodiments, the proximity sensor is an infrared (IR) sensor or any electronic sensor configured to detect an electromagnetic field or a beam of electromagnetic radiation (e.g., infrared, laser).

In some embodiments, the proximity sensors include optical or infrared imaging. For example, video camera 163 may be configured to detect proximity based on the incident light disparity such as detecting a dim, low intensity light when close to the skin and a brighter intense light away from the skin. In some embodiments, infrared sensors are con-figured to capture images that distinguish a slightly heated region caused by the friction of dragging blades 151 across the skin. In addition, shaving system 100 may be configured to capture a profile of the slightly heated region and analyze the captured profile for uneven wear (e.g., imbalances in blade attrition).

In some embodiments, proximity sensor is an accelerom-eter, which can detect the strokes count as well as the hand motion acceleration, which might assist in indicating dull-ness based on excess force applied by the user.

In accordance with some embodiments, the proximity sensor is a mechanical friction sensor that detects mechani-cal deflections in a region where blades 151 contact the skin. Often, the mechanical deflections facilitate a mechanical friction sensor to detect both compressive forces (e.g., FIG.

2A-2C) and tensile forces (e.g., FIG. 3A-3C) in a region where blades 151 contact the skin. In some embodiments, the proximity sensor is a mechanical friction sensor that uses a piezoelectric film. In some instance, the mechanical friction sensor is attached to the front of blade cartridge 150 adjacent to blades 151 in a region that contacts the skin. In some instances, the mechanical friction sensor uses a piezoelectric film that attaches to the front of blade cartridge 150 and adjacent to blades 151 to detect contact between blade cartridge 150 and the skin. In some instances, the mechanical friction sensor is attached between at least one blade 151 and handle 140.

In some embodiments, the proximity is a piezoelectric friction sensor that attaches between blades 151 and the body of blade cartridge 150. In some embodiments, the proximity or the contact sensor is a piezoelectric sensor that attaches to one or more blades 151 to detect the deflection of each blade 151.

As depicted in FIG. 4, lever assembly 130 of shaving system 100 is configured to sense both a normal force, FN (e.g., FIG. 2A-2C), and a tangential force, FT (FIG. 3A-3C), in a region where blades 151 contact the skin. In particular, lever assembly 130 includes second slide bearings 133 that moves second fulcrum 132 in a direction of applied tangential force (e.g., friction force). That is, the applied tangential force (e.g., friction force) adjusts the position of second fulcrum 132 along input arm 138 that in turn adjusts the position of first fulcrum 131 to pivot along output arms 134. This adjustment transmits applied tangential force (e.g., friction force) on the blade 151 to the output arm 134 to depress force sensor 120.

One advantage of sensing both a normal force, FN, and a tangential force, FT, is that the combination provides a force-based profile of each shaving stroke, which facilitates distinguishing a shaving stroke performed using a worn blade from a shaving stroke performed using a fresh blade with respect to each of performance, quality of shave, and shave stroke count. In some instances, microcontroller 160 is configured to collect and store in first memory 161, data associated with the forces applied to force sensor 120 for a portion of a shaving session.

Another parameter that can be used to determine a shaving stroke performance and count is the duration blade 151 is in contact with the skin. In this approach, microcontroller 160 is configured with a timer that measures the period of time that the proximity sensor detects contact between blade 151 and the skin. For this technique, the contact duration is compared to a contact duration threshold to determine a completed shaving stroke. In some embodiments, the proximity sensor is configured to detect when at least one blade 151 contacts the skin. In some instances, microcontroller 160 may not accurately interpret the occurrence of a shaving stroke when the proximity is too short or too long duration. As such, the contact duration threshold may be adjusted by the user (e.g., using external device 505 via wireless communication unit 110 to wireless module 555).

In some embodiments, microcontroller 160 or the external device 505 is configured to automatically and incrementally adjust a threshold value (e.g., contact duration threshold) representative of the period of time that the proximity sensor detects contact between blade 151 and the skin, for instance, based on the user's behavior. In some embodiments, microcontroller 160 is configured to provide instructions to an external device 505 to incrementally adjust a threshold value (e.g., contact duration threshold) representative of the period of time that the proximity sensor detects contact between blade 151 and the skin based on the user's behavior. For example, a woman shaving her legs may have long contact shaving strokes, whereas a man shaving his face may have short contact shaving strokes. In these instances, microcontroller 160 is configured to adaptively adjust (e.g., using heuristic learning) the contact duration threshold to calculate a more accurate metric for the total accumulated time that the blade 151 made contact with the skin. In conjunction with the counting of total number of shaving strokes in a shave session, adaptive learning (e.g., heuristic learning) facilitates a more accurate estimate for predicting the blade attrition.

Shaving system 100 may also provide a quantitative comparison based on manufacturers data. For example, manufacture may report that a particular blade cartridge 150 that is reported to last up to five weeks. Based on the average number of shaving strokes determined for a user to be 150, microcontroller 160 would determine an expected lifetime of 5,250 (e.g., 150×5×7). In some embodiments, microcontroller 160 is configured to provide instructions to external device 505 to determine a total number of occurrences detected by the proximity sensor in second memory 570 and display on a display a quantitative comparison between the total number of shaving strokes and a number of shaving strokes expected over the lifetime of blade 151.

In some embodiments, shaving system 100 includes indicator display 510 disposed on handle 140. In some instances, microcontroller 160 is configured to receive the quantitative comparison from external device 505 via wireless communication unit 110 and display on the display 510 a dullness indicator representative of the quantitative comparison.

In some embodiments, second memory 570 is electrically connected to external device 505. (FIG. 12) In some instances, second memory 570 is configured to store data associated with the at least one blade 151.

In some embodiments, microcontroller 160 is configured to provide instructions to wireless communication unit 110 to transmit a quantitative comparison of the total number of shaving strokes stored in the memory and the number of shaving strokes expected over the lifetime of at least one blade 151 to be provided for display on external device 505.

In general, the quantitative comparison may be represented as an anticipated percentage of remaining use until replacement, as an anticipated number of days remaining, the anticipated number of shaving strokes remaining, or the like. For instance, if the device recorded 4500 shaving strokes on day 30, the user may be notified that the blade is approaching the end of its lifespan with a total of 750 shaving strokes left or 5 days of dull shaving remaining. In some embodiments, the quantitative comparison is a feedback indicator, such as, for example, a display bar, color LEDs, or a small LCD displayed on handle 140 of shaving system 100 akin to dullness indicator 510 represented as a display bar as depicted on handle 140 in FIG. 5.

In some embodiments, shaving system 1M includes a server-based or cloud-based 545 user subscription account that is configured to retrieve and store the relevant information from shaving system 100 for blade cartridge 151, such as the manufacturer, model number, number of completed shaving strokes, anticipated number of days remaining on blade cartridge 151, and the life expectancy of each blade. In some embodiments, the subscription account is configured to notify the user (e.g., via email, pop-up message) that a replacement blade cartridge should be ordered when the anticipated number of days remaining in the life of blade cartridge 151 drops below a certain threshold. In some embodiments, the subscription account is configured to automatically order or purchase a replacement cartridge once the anticipated number of days remaining in the life of blade cartridge 151 drops below a certain threshold.

In some embodiments, the server-based or cloud-based 545 user subscription account is accessible through the external device 505. Accordingly, the external device 505 may be configured to provide access to the server-based or cloud-based user subscription account. The server-based user subscription account is configured to order replacements for the at least one blade based on data or instructions received from the microcontroller 160 in some examples. By way of example, the server-based or cloud-based 545 user subscription is configured to retrieve the quantitative comparison between the total number of shaving strokes from the memory via wireless module 555 and order replacements for the at least one blade when the total number of shaving strokes reaches a threshold value proportional to the quantitative comparison.

It should be appreciated that additional techniques may be implemented to assist in providing an accurate stroke count and quantitative comparison, such filtering techniques (e.g., low-pass filters to remove flicker noise) and statistical analysis (e.g., standard deviation, expected value).

To conserve resources, microcontroller 160 may be configured to provide sensory data to external device 505. As such, microcontroller 160 is configured to transmit sensory data via wireless communication unit 110 to wireless module 555 on external device 505. It should be understood that many of the computations performed by microcontroller 160 may be performed on external device 505 and transmitted and/or stored to first memory 161 on shaving system 100. This beneficially conserves power on shaving system 100 and in some instances may reduce the total processing time. Likewise, the quantitative comparison and other parameters may be displayed on external device 505.

2. Shaving System 100 with Image Camera 163

As depicted in FIG. 1A-FIG. 1H, shaving system 100 includes handle 140, at least one blade 151 connected to handle 140, microcontroller 160 attached to handle 140, and one or more sensors adjacent at least one blade 151. In some embodiments, the one or more sensors are configured to send sensory data to microcontroller 160. In some embodiments, one or more sensors is camera 163 having an image sensor configured to capture video and/or still images. In some instances, camera 163 is configured to capture both frames and video. In some embodiments, microcontroller 160 is configured to stream video data from camera 163 and/or audio data from microphone 165 via wireless communication unit 110 to be displayed on external device 505 (e.g., smartphone, tablet, laptop, desktop).

In some embodiments, shaving system 100 includes wireless communication unit 110 attached to handle 140 and electrically connected to microcontroller 160. In some embodiments, wireless communication unit 110 is configured to transmit and receive data from microcontroller 160 to external device 505 (e.g., FIG. 5 and FIG. 12).

As depicted in FIG. 12, memory 161 is electrically connected to microcontroller 160. In some embodiments, memory 161 is configured to store data associated with at least one blade 151.

In some embodiments, microcontroller 160 is configured to instruct image camera to capture frames of the images from camera 163 and instruct wireless communication unit 110 to stream the frames to be processed, analyzed, or displayed on the external device 505. In some instances, the frames are stored in first memory 161 or in an external storage (e.g., second memory 570) on external device 505.

Figure 8:
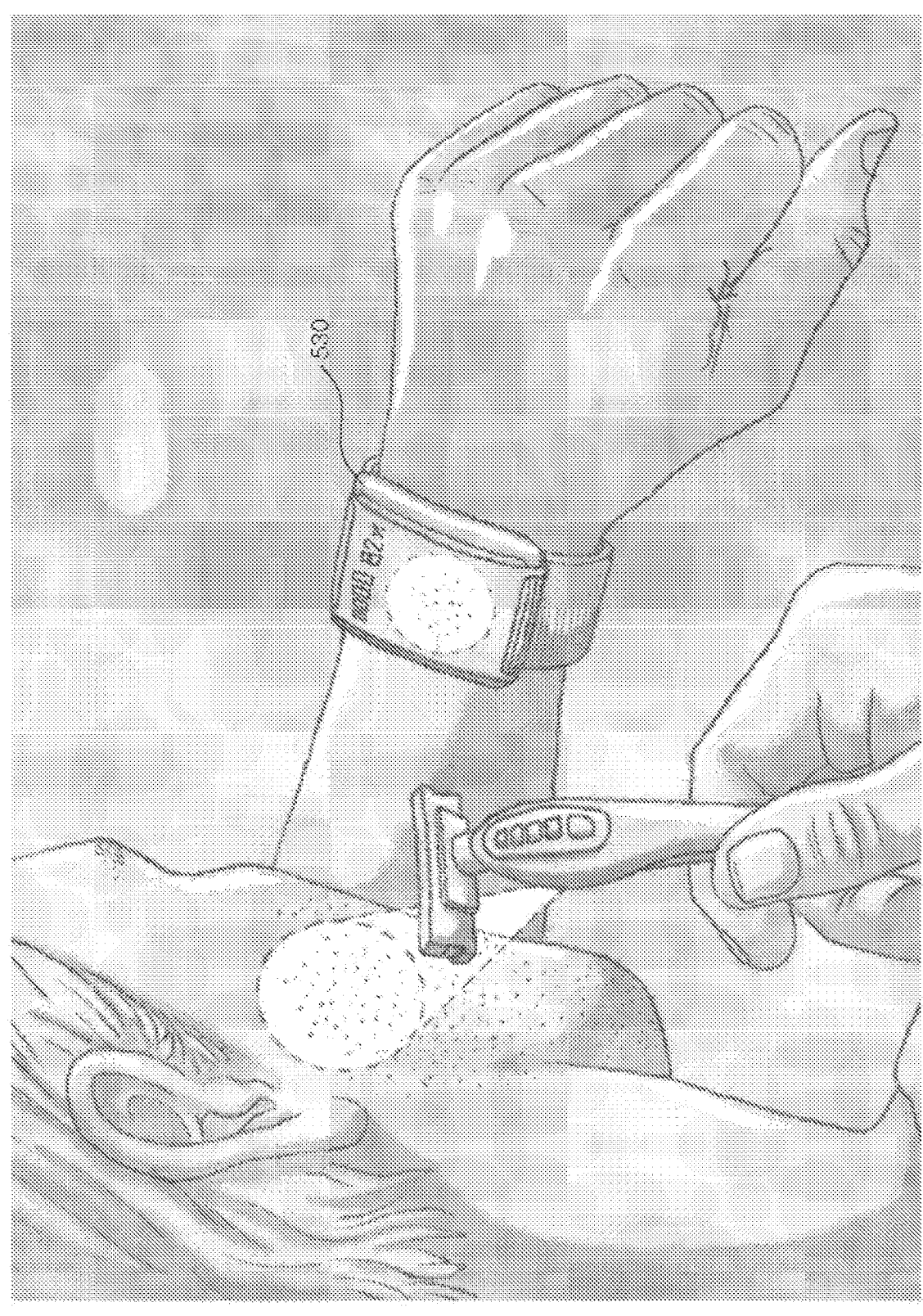
FIG. 8 illustrates a shaving system with image camera that streams video via a wireless communication unit to an external wristwatch according to an embodiment of the present invention.

In some embodiments, external device 505 is a wearable computing device, such as a wristwatch as depicted in FIG. 5, FIG. 6, and FIG. 8. In some embodiments, external device 505 is a hand-held phone 525 (e.g., mobile phone) as depicted in FIG. 7 or tablet that is held or mounted nearby similar to a portable hand mirror. In some embodiments, external device 505 uses a media player embedded in a user interface (UI) that is configured to play the video and/or audio captured in real time. In some instances, the media player may include other features, such as zoom (e.g., manual zoom or automatic zoom) and/or correction functionality that conditions to streamed media (e.g., image sharpness, contrast, color balance, filtering techniques).

One benefit of using camera sensor 163 is to provide a shaving view to the user on external device 505 without the need for a mirror, as well as viewing regions difficult to view with a single mirror (e.g., back of the neck). Further, having video streamed from the camera 163 offers a close-up look of the shaving regions to ensure a proper shaving technique and to better check the quality of the shave.

An advantage of streaming the video is that external device 505 can provide feedback to a user in real time or in near real time. For example, in some embodiments, external device 505 is configured to analyze the frame images to determine a blade attrition comparison based on the analyzed frame images and present for display on display 565 on external device 505 the blade attrition comparison represented as a compass-like arrow that updates in near real time.

Microcontroller 160 may, in some examples, be configured to offload other tasks in order to save on power and provide more efficient utilization of computational resources, particularly during computationally intensive operations. For example, microcontroller 160 is configured to instruct wireless communication unit 110 to transmit frames to external device 505. In response, external device 505 may include image analysis module 560 (FIG. 12) to differentiate a color variation between adjacent pixels in the captured frame and store in first memory 161 a quantitative comparison for the remaining hair. In some instances, the color between adjacent pixels may vary from a pinkish hue of bare skin that has been fully shaven to dark black that is unshaven. From the frame, external device 505 (e.g., via image analysis module 5601 is configured to determine the amount of hair remaining. In some embodiments, external device 505 is configured to determine a quantitative comparison for the remaining hair based on the captured frames. In some embodiments, the amount of hair remaining is provided as a percentage of remaining hair that ranges from 100% (e.g., thick beard) to 0% (e.g., bare skin).

At times, external device 505 and wireless communication unit 110 may exchange data back and forth in real time. This is particularly useful to provide a user with feedback with shaving. For example, in some embodiments, microcontroller 160 is configured to provide a real-time quantitative comparison, such as a variable pitch sound or a recorded voice from speaker 164, a visual indicator 510, and the like, on shaving system 100. In some embodiments, microcontroller 160 is configured to provide an audio signal to instruct speaker 164 (e.g., electrical audio device) to emit a sound corresponding to the quantitative comparison for the remaining hair. In some examples, the sound is a variable pitched sound or a recorded voice.

In some instances, it is beneficial to offload data from shaving system 100 to external device 505. For example, a feedback indicator, such as, for example, display 565 on external device 505 may be larger or easier to manipulate (e.g., a touch screen). In these instances, microcontroller 160 transmits data in real time via wireless communication unit 110 and wireless module 555 on external device 505 that is displayed on display 565 on external device 505. In some embodiments, external device 505 is configured to present the quantitative comparison for the remaining hair for display on external device 505 (e.g., display 565).

Figure 9:
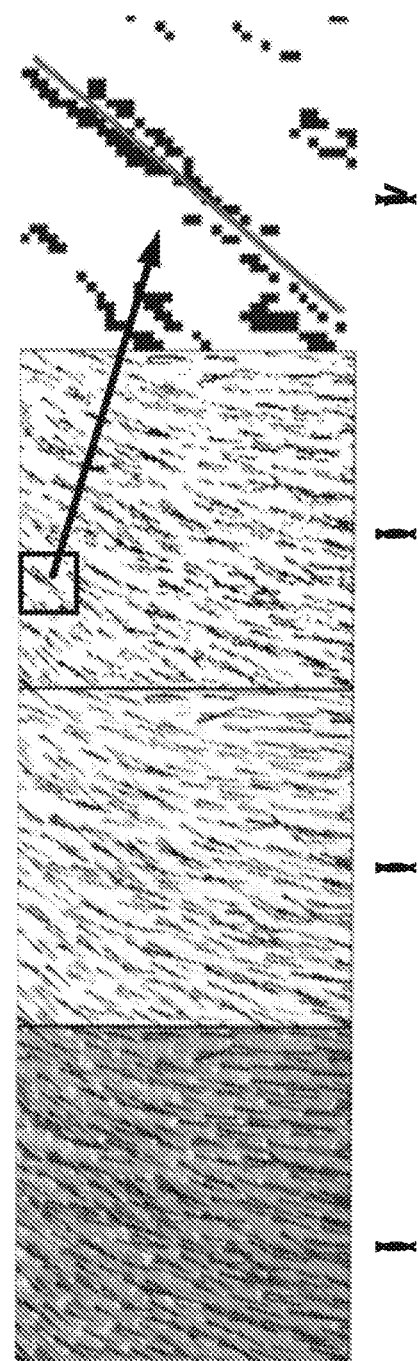
FIG. 9 illustrates images of hair at monotonically increasing contrast according to an embodiment of the present invention.

As depicted in FIG. 9, microcontroller 160 is configured to capture a frame via miniature camera 163 to determine the amount of hair remaining over a certain area. In particular, microcontroller 160 captures a frame and compares the color difference between adjacent pixels to estimate the total amount of hair remaining over a specific area. Microcontroller 160 stores to first memory 161 the total amount of hair remaining over a certain area as a quantitative comparison for the remaining hair. As depicted in FIG. 7, microcontroller 160 is configured to transmit via wireless communication unit 110 the quantitative comparison for the remaining hair to wireless module 555 on external device 505 (e.g., a wristwatch) that displays the frame of the specific area along with the quantitative comparison for the remaining hair.

Figure 10A:
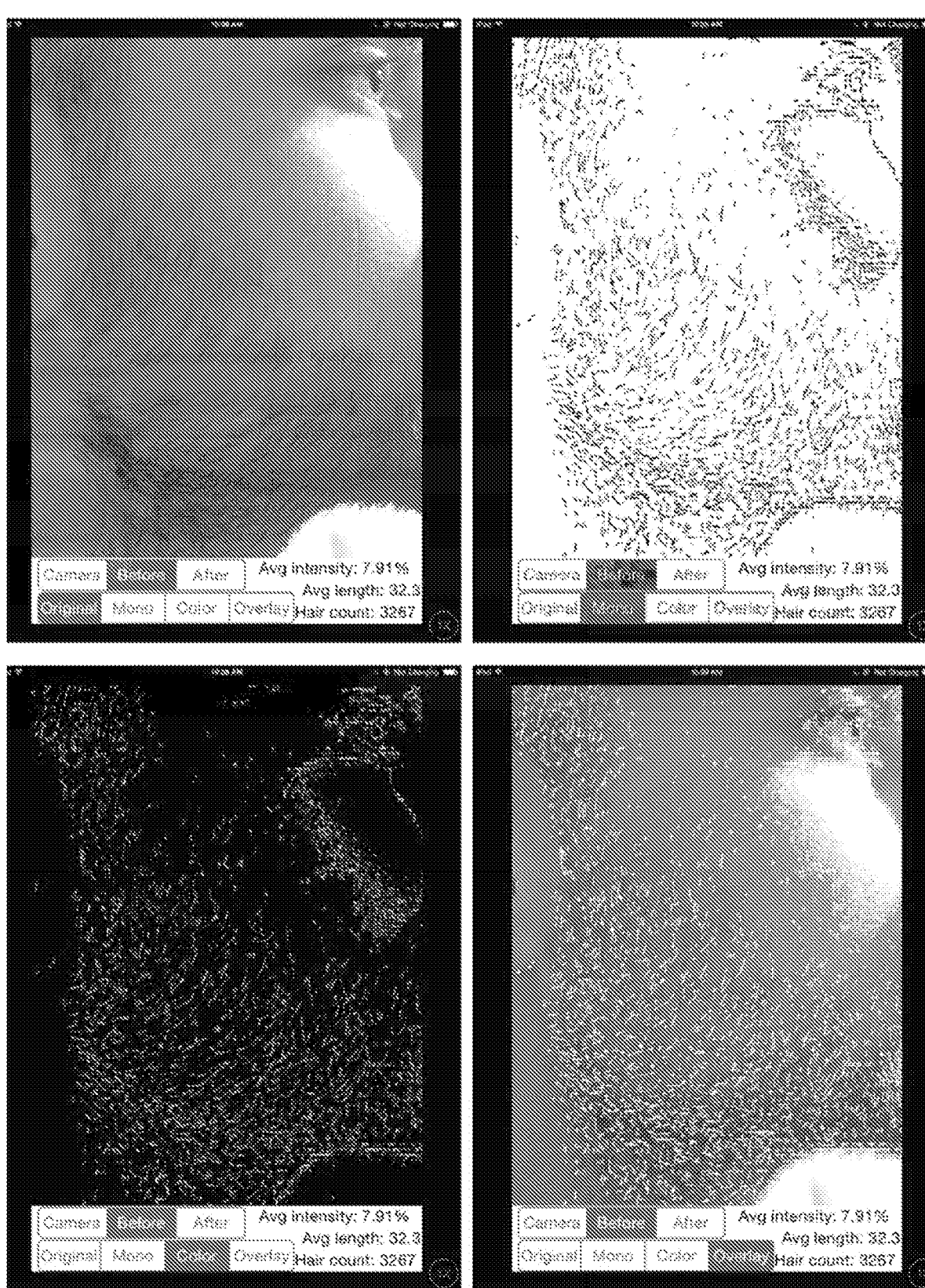
FIG. 10A illustrates various images of an unshaven area of skin according to an embodiment of the present invention.
Figure 10B:
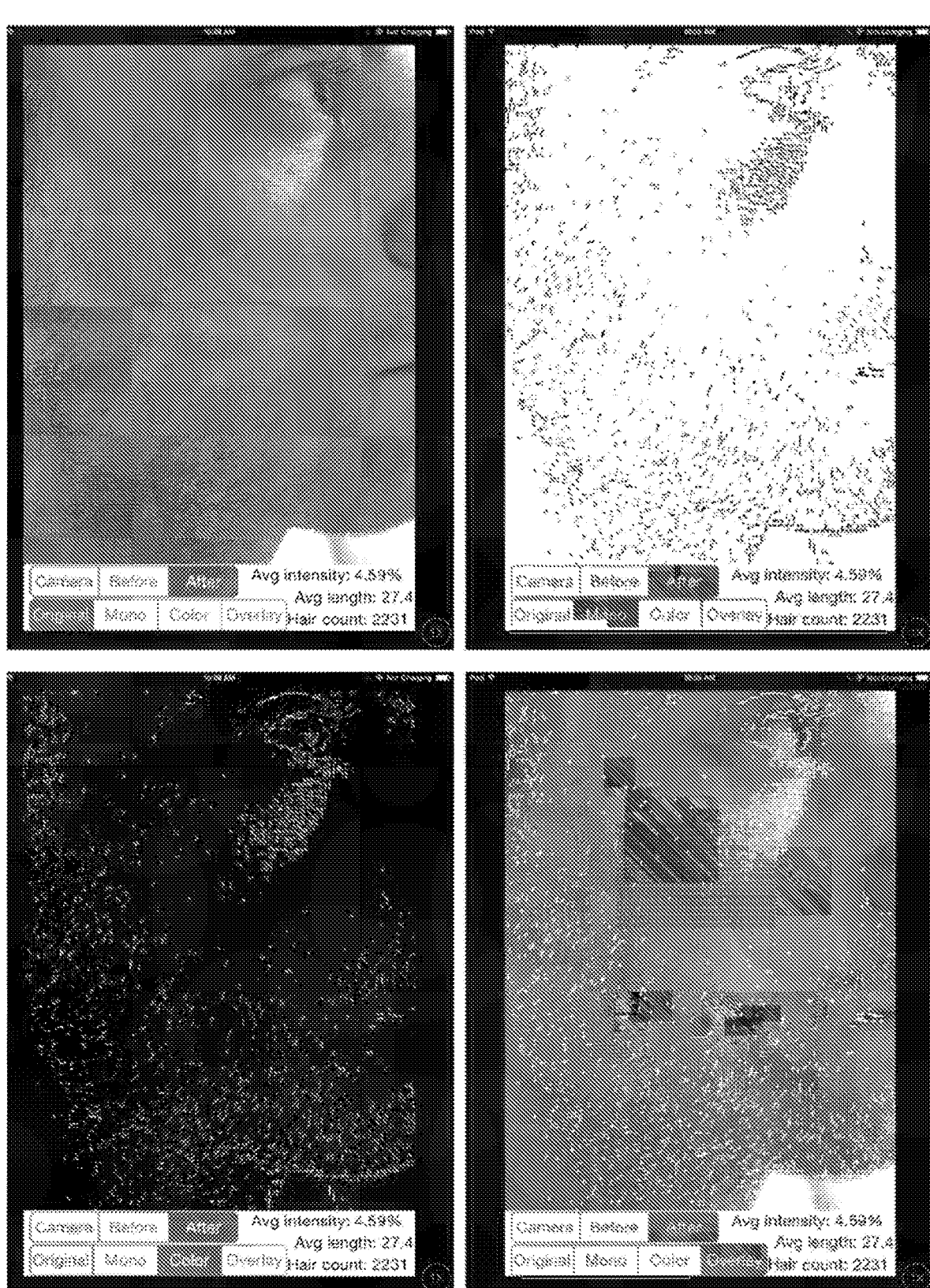
FIG. 10B illustrates various images of a shaved area of skin according to an embodiment of the present invention.

External device 505 is configured to analyze a frame to determine the general growth direction of the remaining hair. For example, one approach to determine the general direction of hair growth is to filter the frame image using an edge detection filter, which contrasts the edges of hairs on the face as depicted in FIG. 10A-FIG. 10B. In this instance, microcontroller 160 is configured to capture and transmit the frame to external device 505, and external device 505 implements an edge detection filter to distinguish the hairs. In some embodiments, the edge detection filter is a Sobel filter or a Canny filter.

In some embodiments, external device 505 is configured to determine a general direction of the remaining hair based on the captured frames, and provide for display on external device 505, a directional indicator representative of a general direction of the remaining hair that corresponds to the best direction to drag the at least one blade over the skin. In some embodiments, external device 505 is configured to provide for display on the external device 505, the filtered frame images. In some embodiments, external device 505 is configured to overly filtered frame images with the streamed video frame image.

As illustrated in FIG. 9, various filter techniques may be implemented to distinguish the hair. In this instance, frame image (i) a filter is applied that iteratively increases the contrast of the hair edges with respect to the background. After a few iterations (iii) as depicted in the zoomed-in region of FIG. 9, the hair are contrasted and "least square analysis" or "regression analysis" is applied to the remaining hair to calculate a general direction of the remaining hair. In some embodiments, external device 505 is configured to implement a "least square analysis" or "regression analysis" to the remaining hair to calculate the general direction of the remaining hair. In some instances, external device 505 is configured to provide a quantitative value representative of the general direction of hair growth and provide for display on the external device 505 the general direction of the remaining hair to memory.

This approach provides a directional indicator that corresponds to the best direction in which to drag at least one blade 151 over the skin. Determining the general direction of hair growth also allows the user to orient shaving system 100 according to the best direction to drag blade 151 over the skin. In some embodiments, the directional indicator is displayed on the external device as a circular bar graph that is updated and/or filled up in near real time. In some embodiments, the directional indicator is displayed on the external device 505 as a compass-like arrow that updates in near real time.

In some instances, the external device 505 determines the directional indicator based on the received frame images from microcontroller 160 (e.g., via wireless communication unit 110 and wireless module 555).

Another approach to determine the general direction of hair growth is to determine the angle value as color of each pixel based on HSV color space, which is representative of the hair directions. In this technique, external device 505 or microcontroller 160 is configured to filter the frame images using a median filter (e.g., Sobel filter) to reduce high-frequency noise prior to applying an edge detection filter. Next, external device 505 or microcontroller 160 is configured to apply a Canny edge detection filter to frame images to detect edges. Often, the resultant filtered image has thick line edges. As such, microcontroller 160 or external device 505 is configured to apply a line-thinning filter to reduce line thicknesses on frame images. Once the line thicknesses are reduced, microcontroller 160 or external device 505 is configured to determine the angle value as color of each pixel based on HSV color space. The angle value is representative of the line directions (e.g., hair).

Shaving system 100 can also assist in shaping regions of established hair. For example, frame images may include established hair growth regions such as a sideburn, mutton-chops, mustache, goatee, and the like, where the image shows longer hair growth adjacent to short hair growth. In these instances, microcontroller 160 is configured to provide instructions to external device 505 to determine a boundary indicator associated with established hair growth based on the filtered frame images and provide the boundary indicator for display on external device 505. For example, external device 505 may overlay the boundary indicator with a frame. In some instances, external device 505 is configured to overlay the boundary indicator with streamed video frame images.

As viewed from external device 505, the streamed video would show the boundary indicator at the boundary between established hair growth region and stubble region to be shaved. In some instances, the boundary indicator is a line (e.g., a curved line or a straight line) that overlays a streamed video or frame. As such, the boundary indicator assists the user to balance the symmetry of unshaven regions as well as facilitate shaving near the contour of a beard or mustache.

In some embodiments, external device 505 is configured to adjust the boundary indicator according to predefined features selected by a user. For example, a user may adjust a goatee style and select within external device 505 to overlay the goatee style with steamed video as a guide for regions to shave. In some instances, the boundary that represents sideburns is extended to incorporate a larger short hair region when the user desires muttonchops. In these instances, microcontroller 160 or external device 505 is configured to extend or reduce the boundary indicator and display an alternate quantitative boundary indicator on external device 505 representative of the predefined feature. In some embodiments, external device 505 is configured to overlay the boundary indicator with streamed video frame images. In some instances, the boundary indicator is displayed as a line. In some embodiments, the alternate quantitative boundary indicator overlays a streamed video or frame to guide the user in trimming and forming a desired look.

Monitoring hair characteristics is one approach to improve the quality of the shave. One technique for detecting blade attrition includes capturing a first image (e.g., frame) of a region of skin with hair using camera 163. In some instances, camera 163 is disposed below handle 140 and configured to view the region before blade 151 is dragged across the skin prior to shaving, as depicted in FIG. 7. This configuration facilitates determining a quantitative comparison for the number of hairs in the region of skin. In some instances, camera 163 is disposed above handle 140 and configured to view the region after blade 151 is dragged across the skin after shaving, as depicted in FIG. 10. This configuration facilitates determining a quantitative comparison before and after a shaving stroke of the number of hairs in the region of skin.

Some embodiments include first camera 163 disposed below handle 140 and second camera 163 above handle 140. This configuration facilitates capturing a first image (e.g., frame) of a region of skin with hair in front of blade 151 and capturing a second image (e.g., frame) of a region of skin with hair behind blade 151. In some embodiments, one or more processors use the captured first and second images in determining a first and second quantitative comparison and providing an attrition comparison based on the difference between the second quantitative comparison and the first quantitative comparison to an electrical device.

To conserve power and/or save on resources, microcontroller 160 may be configured to provide raw sensory data to external device 505. As such, microcontroller 160 is configured to transmit raw sensory data via wireless communication unit 110 to wireless module 555 on external device 505. It should be appreciated that many of the computations performed by microcontroller 160 may be performed on external device 505 and transmitted and/or stored to first memory 161 on shaving system 100. This beneficially conserves power on shaving system 100 and in some instances may reduce the total processing time. Likewise, the quantitative comparison and other parameters may be displayed on external device 505.

Shaving system 100 is not meant to be limited to a cartridge-razor body style and may have other body styles conducive to disposable razors, safety razors, electric razors, straight razors and the like. For example, in some embodiments, shaving system 100 may be an independent mountable electrical device that can be attached or clipped on to any hand-held razor. In these instances, users can purchase their preferred brand of razor and attach the mountable electrical device to the hand-held razor. One advantage to mountable electrical device to the hand-held razor is that the user can evaluate and compare different razors and select which razor best accommodates their shaving technique.

In some examples, a mountable electrical device includes a fixture configured to fasten to a precision hand tool, microcontroller 160 attached to the fixture, and wireless communication unit 110 attached to the fixture and electrically connected to microcontroller 160, wherein wireless communication unit 110 is configured to transmit and receive data from microcontroller 160 to external device 505, first memory 161 electrically connected to microcontroller 160, wherein memory 161 is configured to store data from microcontroller 160, and one or more sensors attached to the precision hand tool, wherein the one or more sensors are configured to provide sensory data to microcontroller 160. In some instances, one of the one or more sensors is a proximity sensor. In some instances, one of the one or more sensors is image camera 163 configured to provide frames of images to microcontroller 160.

In addition, various components of shaving system 100 should not be limited to razors but may be applicable to other aspects. For example, the independent mountable electrical device described above may be attached to high-precision hand tools that provide and/or improve upon real time information to facilitate specific procedures. Further, the mountable electrical device may be small, lightweight, and wireless to provide untethered freedom of motion for many applications. Various applications that would benefit from a mountable device are electrical tools, automotive tools, carpentry tools, surgical tools, and the like. It should be recognized that the above mountable electrical device may be incorporated in any tool that would benefit from real time information to facilitate specific procedures.

3. Optical Technique for Determining Blade Attrition

FIG. 10A illustrates unfiltered and filtered images of an unshaven area of skin on a face. In this instance, microcontroller 160 captured the image frame via camera 163 and transmitted (e.g., streamed) the image frame via wireless communication unit 110 to wireless module 555 on external device 505. Wireless module 555 forwards the image frame to image analysis module 560 on external device 505 for further processing. Image analysis module 560 uses processors 575 on external device 505 to filter and analyze the image frame to determine a first quantitative comparison for a hair characteristic. For example, as depicted in FIG. 10A, analysis module 560 calculates three hair characteristics that may be used as a first quantitative comparison for a hair characteristic, specifically, the hair count (e.g., Hair count: 3267), the average length of the hair (e.g., Avg. length: 32.3), and average density (e.g., avg. intensity: 7.91%).

As depicted in FIG. 10A and FIG. 10B, display 565 on external device 505 is a touch screen that includes selectable software buttons or switches that facilitate selecting between the original frame image (e.g., original), edge-filtered frame image (e.g., mono), edge-filtered image with the color inverted (e.g., color), and an overlay of the original and edge-filtered image with the color inverted (e.g., overlay). In addition, display 565 on external device 505 includes selectable software buttons to select between stream video (e.g., wireless communication unit 110 to wireless module 555) from camera 163 (e.g., camera), frame images before blade 151 is dragged across the skin (e.g., Before), and frame images after blade 151 is dragged across the skin (e.g., After).

FIG. 10B illustrates unfiltered and filtered images of an area of skin on a face where "dull" blade 151 is dragged once across the surface of the skin. In this instance microcontroller 160 captured the image frame via camera 163 and transmitted (e.g., streamed) the image frame via wireless communication unit 110 to wireless module 555 on external device 505. Wireless module 555 forwards the image frame to image analysis module 560 on external device 505 for further processing. Image analysis module 560 uses processors 575 on external device 505 to filter and analyze the image frame to determine a second quantitative comparison for a hair characteristic. In this instance, analysis module 560 calculates three hair characteristics that may be used as a second quantitative comparison for a hair characteristic, specifically, the hair count (e.g., hair count: 2231), the average length of the hair (e.g., Avg. length: 27.4), and average density (e.g., Avg. intensity: 4.59%).

Comparing the first quantitative comparisons of the "before" images of FIG. 10A with the second quantitative comparison for a hair characteristic of FIG. 10B of the "after" images, indicates that a single pass of blade 151 over a region of skin removed about 31% of the hair at the skin and shortened the overall length the hair by about 15%, which decreased the average density by about 42%. A visual inspection of the "after" images of FIG. 10B confirms that blade 151 did not cut the majority of the hair down to the skin in the shaved region, which is an indication that blade 151 is dulling.

FIG. 11 is a flow diagram illustrating method 1100 for gauging blade attrition (e.g., determining the dullness of blade 151). In some embodiments, method 1100) may be performed at microcontroller 160 as part of shaving system 100. In some embodiments, method 1100 may be performed at external device 505 to conserve power and save on resources on shaving system 100. Some operations in method 1100 may be combined, the order of some operations may be changed, and some operations may be omitted.

At block 1105, method 1100 may filter, using one or more processors (e.g., processor cores 169, processors 575), a first image of a region of skin with hair. For example, microcontroller 160 may be configured to execute one or more modules or components to filter, using one or more processors (e.g., processor cores 169, processors 575), the first image of a region of skin with hair that was captured using camera 163. In some embodiments, filtering the first image of a region of skin with hair uses an edge detection filter. In some embodiments, the edge detection filter is a Sobel filter or a Canny filter.

At block 1110, method 1100 may determine, using one or more processors (e.g., processor cores 169, processors 575), a first quantitative comparison for a hair characteristic in a region of skin based on the first filtered image. For example, microcontroller 160 may be configured to execute one or more modules or components to determine, using one or more processors (e.g., processor cores 169, processors 575), a first quantitative comparison for a hair characteristic in a region of skin based on the first filtered image. In some embodiments, the hair characteristic is the quantity of hair. In some embodiments, the hair characteristic is the density of hair. In some embodiments, the hair characteristic is the average length of hair.

At block 1115, method 1100 may shave the region of skin with blade 151. For example, microcontroller 160 may be configured to execute one or more modules or components to shave the region of skin with blade 151.

After the region of skin has been shaved, at block 1120, method 1100 may filter, using one or more processors (e.g., processor cores 169, processors 575), a second image of a region of skin with hair. For example, microcontroller 160 may be configured to execute one or more modules or components to filter, using one or more processors (e.g., processor cores 169, processors 575), the second image of the region of skin with hair that was captured using camera 163. In some embodiments, filtering the second image of a region of skin with hair includes using an edge-detection filter. In some embodiments, the edge-detection filter is a Sobel filter or a Canny filter.

At block 1125, method 1100 may determine, using one or more processors, a second quantitative comparison for the hair characteristic in the region of skin based on the second filtered image. For example, microcontroller 160 may be configured to execute one or more modules or components to determine, using one or more processors (e.g., processor cores 169, processors 575), a second quantitative comparison for the hair characteristic in the region of skin based on the second filtered image.

In some embodiments, determining the first or second quantitative comparison for the hair detection in the region of skin includes differentiating a color variation between adjacent pixels in the captured image.

In some embodiments, method 1100 may include sending an audio-signal to an electrical audio unit configured to emit sound. The electrical audio unit emits a sound associated with either the blade attrition comparison or the first or second quantitative comparison for the hair characteristic in the region of skin.

In some embodiments, determining the first or second quantitative comparison for the hair characteristic in the region of skin further includes determining a quantitative boundary indicator that distinguishes a boundary between an established hair growth region and a stubble region to be shaved based on the first or second filtered image.

At block 1130, method 1100 may determine a quantitative boundary indicator that distinguishes a boundary between an established hair growth region and a stubble region to be shaved based on the first or second filtered image. For example, one or more processors (e.g., processor cores 169, processors 575) may be configured to execute one or more modules or components to determine a quantitative boundary indicator that distinguishes a boundary between an established hair growth region and a stubble region to be shaved based on the first or second filtered image.

At block 1135, method 1100 may determine a general direction of the remaining hair based on the first or second filtered image. For example, one or more processors (e.g., processor cores 169, processors 575) may be configured to execute one or more modules or components to determine a general direction of the remaining hair based on the first or second filtered image. As depicted in FIG. 9 (*iv*), in some embodiments, determining the general direction of the remaining hair includes a "least square analysis" or "regression analysis".

At block 1140, method 1100 may provide for display, a general direction of the remaining hair, wherein the general direction is associated with the best direction to drag the blade over the region of skin. For example, one or more processors (e.g., processor cores 169, processors 575) may be configured to execute one or more modules or components to provide for display, a general direction of the remaining hair, wherein the general direction is associated with the best direction to drag the blade over the region of skin.

At block 1145, method 1100 may provide for display, a blade attrition comparison based on the difference between the second quantitative comparison and the first quantitative comparison. For example, microcontroller 160 may be configured to execute one or more modules or components to provide for display, a blade attrition comparison based on the difference between the second quantitative comparison and the first quantitative comparison. The blade attrition indicator may comprise a life remaining indicator and/or a dullness indictor for at least one blade.

4. Blade Cartridge 150 with Curved Blades 151

Figure 13A:
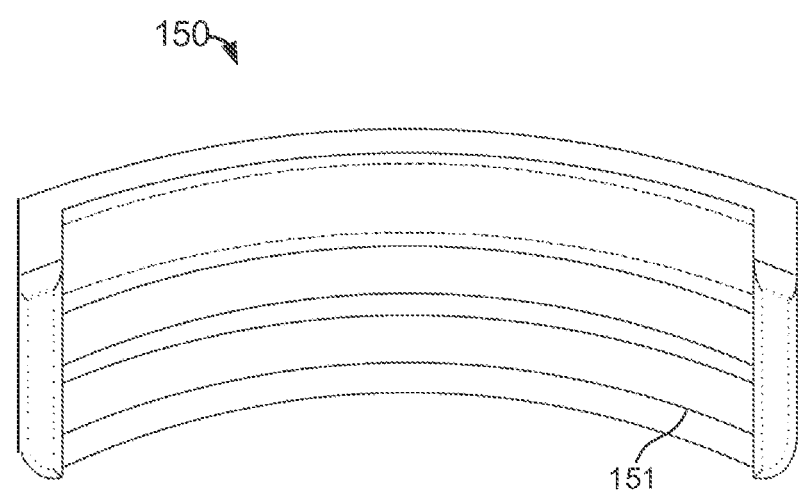
FIGS. 13A and 13B illustrate a front view and an exploded view, respectively, of a blade cartridge 150 with blades that are slightly curved according to an embodiment of the present invention.
Figure 13B:
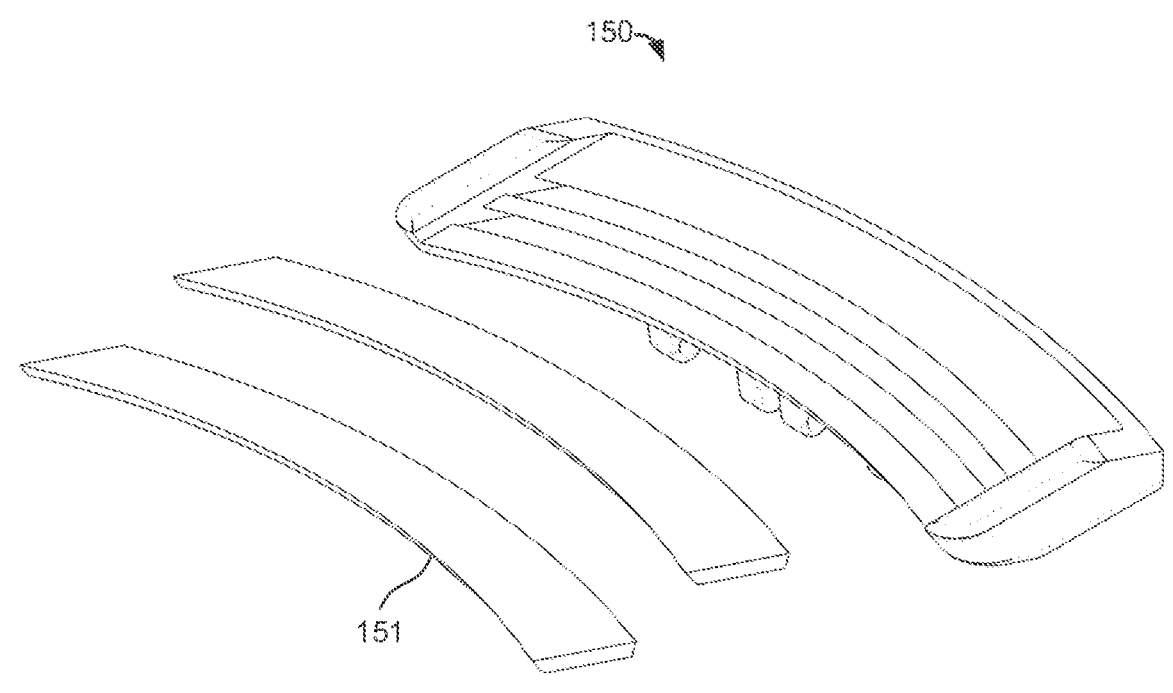

FIG. 13A and FIG. 13B illustrate a front view and an exploded view, respectively, of a blade cartridge 150 with blades that are slightly curved. The views illustrate blade cartridge 150 that includes a fixture configured to fasten to a razor (e.g., safety razor, disposable razor, cartridge razor) and at least one blade 151 connected to the fixture, wherein the at least one blade 151 is curved. As illustrated, blades 151 of a blade cartridge 150 are slightly curved in order to reduce the cutting resistance of the hair during impact with the blade. In some instances, curved (e.g., sickle-like) blades

151 reduce impact resistance along the direction of the motion of blade 151, which results in a more efficient cut that is smoother to the skin.

Figure 13C:
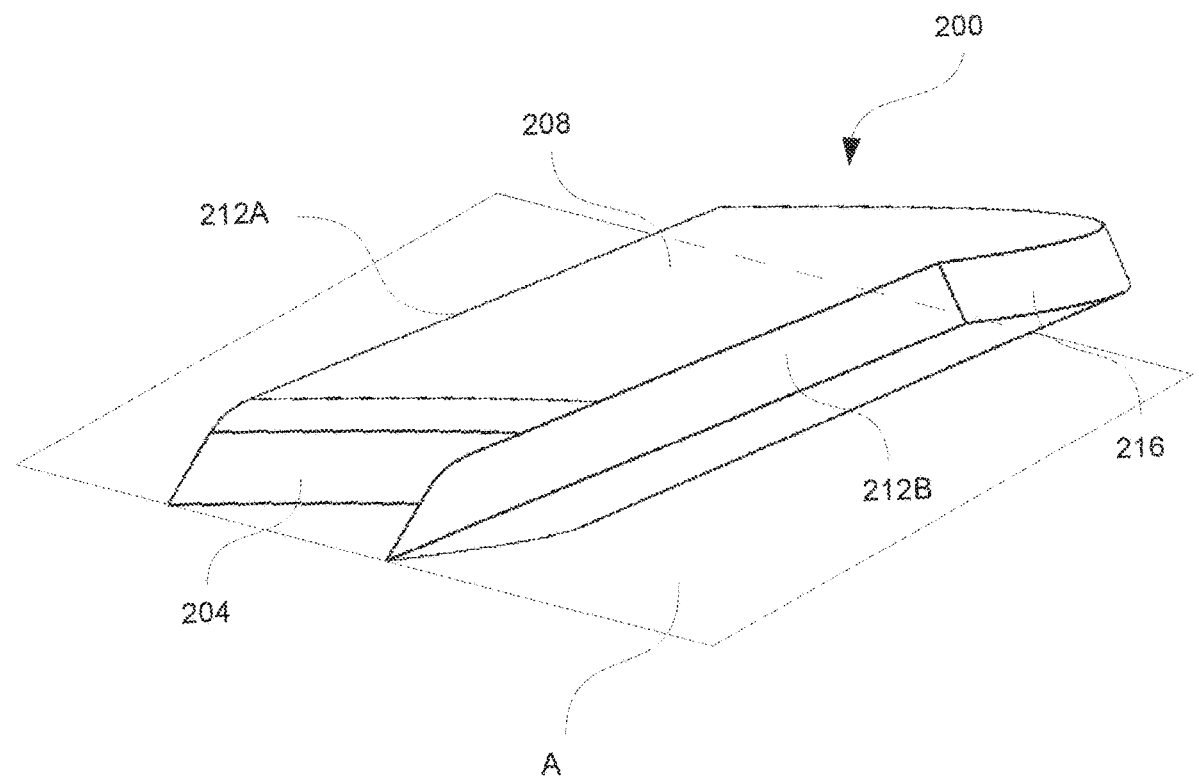
FIG. 13C is a perspective view of the blade shown in FIGS. 13A and 13B according to an embodiment of the present invention.
Figure 13D:
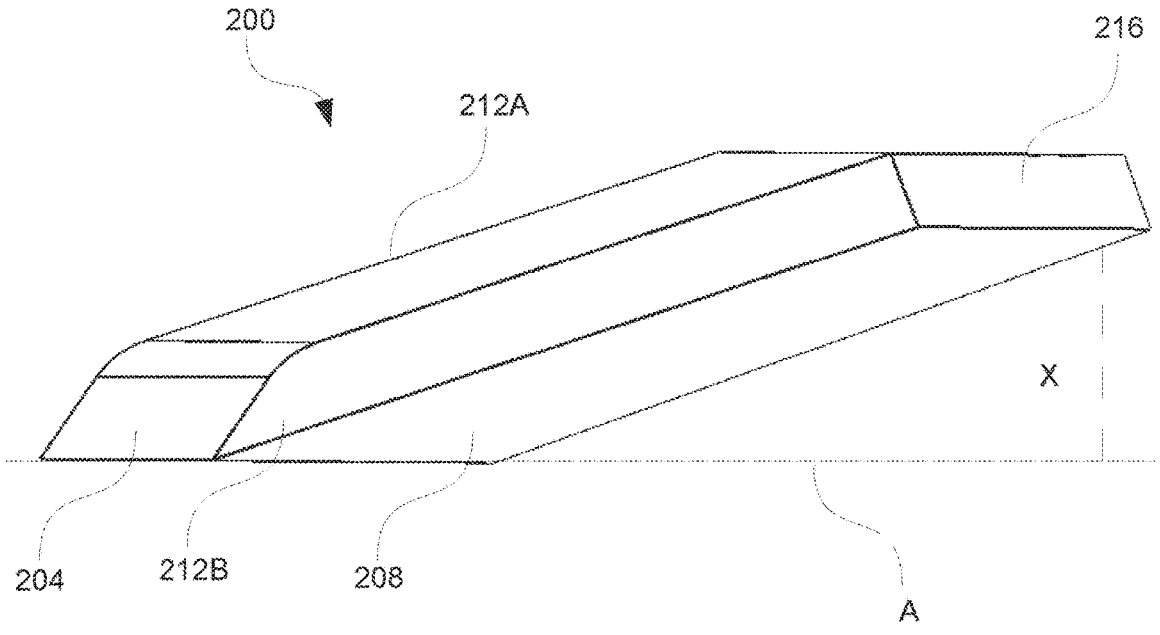
FIG. 13D is a side view of the blade of FIGS. 13A-13C, according to an embodiment of the present invention.
Figure 13E:
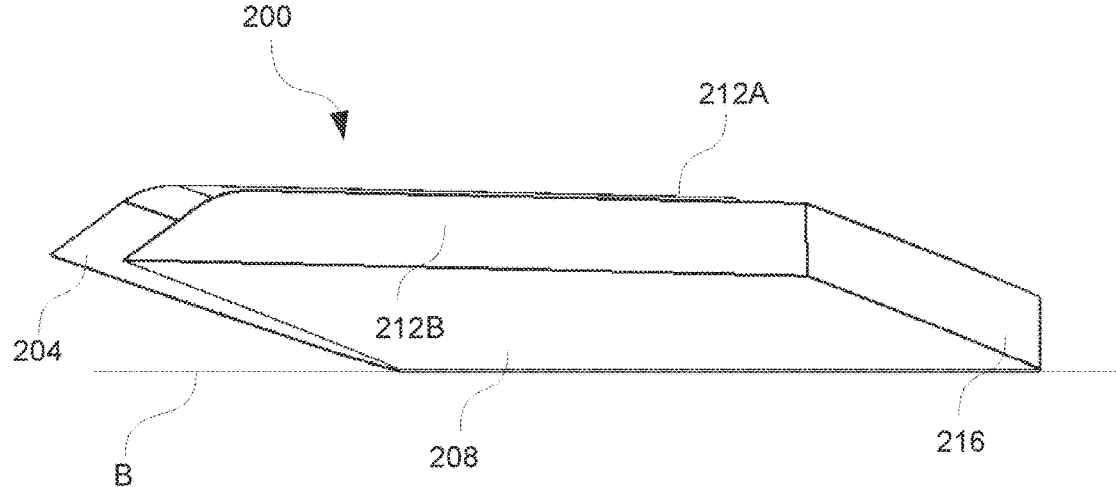
FIG. 13E is another side view of the blade of FIGS. 13A-13D according to an embodiment of the present invention.

In some embodiments, and as shown in FIGS. 13C to 13E, a blade, such as blade 200, can be slightly curved in multiple planes (e.g., sickle-shaped). Sickle-shaped, for the purposes of this disclosure, means that blade 200 is curvilinear in two planes; namely, the blade has a cutting edge 204 whose longitudinal edge is curvilinear and has a blade middle portion 208 that is curved from a distal lateral side 212A to a proximate lateral side 212B such that when the cutting edge is resting entirely on a plane, (as shown in FIGS. 13C and 13D, plane A), an opposite edge from the cutting edge, back edge 216, is above the surface. An exemplary distance above plane A is shown in FIG. 13D as distance, X.

To further illustrate the curve of blade 200 from lateral side 212A to lateral side 212B, FIG. 13E shows blade resting on the center of blade middle portion 208 on plane B. As shown, cutting edge 204 is entirely above plane B, while both lateral sides 212 are above plane B. A blade configured as described herein can have its entire cutting edge 204 may follow the tangent of the skin. In some embodiments, back edge 216 of blade 200 (or blade 151) is convex and cutting edge 204 is concave.

Similar to straight blades in a parallel configuration, an enclosed arrangement of two or more blades 151 adjacent to each other can be applied to distribute the applied force among blades 151 as each blade 151 contacts the skin. In this instance, at least one blade 151 includes a plurality of blades 151, wherein each of the plurality of blades 151 are parallel to each adjacent blade 151. One advantage of this configuration is that it can help to prevent wrongful cutting of the skin when a sideways motion of blade 151 is applied.

Curved blade 151 may include steel, ceramics (e.g., zirconia, alumina), or nanolattice. In some embodiments, curved blade 151 is made of carbon steel (e.g., austenitic, martensitic, stainless steel). One advantage of using steel blades 151 is that they are easily shaped and formed using machining techniques.

In some embodiments, curved blade 151 is made of ceramics. A ceramic blade 151 may be made through a dry-pressing and sintering process that subsequently sharpens the edge with a diamond grinder. In some instances, the ceramic powder is placed on rotating drum to first create a full ring, taking into account the inner diameter (id) and outer diameter (od), and then cut off sub-sections that are the width of blade 151, prior to cooling. One advantage of ceramic over steel for blades 151 is that ceramic is harder than carbon steel, which results in an edge more resilient to dulling.

5. Blade 151 with a Nanolattice

A nanolattice is a truss structure with connecting truss members implemented at a nanoscale. These structures can be made on a length scale spanning multiple orders of magnitude, for instance, from tens of nanometers to hundreds of microns. The nano-sized connecting truss members, in some examples with tube walls of less than 100 nanometers, facilitate properties different than more dense counterparts. Notably, certain ceramics exhibit a higher hardness than metals but are brittle and tend to chip or fracture under certain loads. In contrast, nanolattices with nano-sized structures and comprising single crystal materials, such as ceramics (e.g., materials having approximately 20 to 60 nanometer wall thickness), do not exhibit elastic instability and have been shown to fully recover at approximately 20 nanometers. Nanolattices maintain high strength yet have been found to be remarkably resilient and less brittle. The advantage of forming blade 151 using a nanolattice (e.g., nanoblade) is that leading edge 1505 of blade 151 would be much less susceptible to dulling.

To form the nanolattice structure, a micro-scaffold structure may be formed (e.g., fabricated) through a process of two-photon lithography (e.g., a microscopic 3D printing) to create the truss structure based on a polymer model. In some instances, this technique includes two laser beams that crosslink and harden a polymer at the point of focus in 3D space. That is, the parts of the polymer exposed to the lasers remain intact while the material that is not exposed dissolves away. In some instances, this technique includes atomic layer deposition (ALD) or sputtering to deposit material (e.g., carbon steel, ceramic) on the truss structure. This technique coats the connecting truss members with a deposited material (e.g., carbon steel, ceramic). In some instances, ALD is based on one or more sequential exposure to a gas that chemically reacts with the surface of the target material (e.g., carbon steel, ceramic) to slowly form a thin film.

The resultant film coats the polymer and forms a rigid shell. After the coated film forms a rigid shell, one end of the truss structure is cut to expose the internal polymer. The exposed polymer truss is removed using an oxygen (e.g., 02) plasma etch. In this instance, the remaining structure is a nanolattice with hollow connecting truss members. That is the nanolattices use less material than dense counterparts. As such, one advantage of nanolattices is that the reduction of material reduces the weight of blade 151 without compromising the strength. In some instances, the nanolattice reduces brittleness (e.g., alumina, ceramics).

FIG. 14A-FIG. 15B, illustrate blade 151 (e.g., nanoblade) that includes front leading edge 1505 of blade 151, spine 1530 of the blade 151, and a nanolattice that connects the front leading edge of blade 151 to spine 1530 of blade 151. In some embodiments, one or more connecting truss members of the nanolattice has a curvilinear geometric shape. By way of examples, a shape of one or more connecting truss members may be a cylinder, an elliptical tube, or a closed-profile elongated tube. In some embodiments, one or more of the tubes of the nanolattice is hollow. Other embodiments may include rectangular tubes, I-beams, C-beams, and the like.

In some instances, these tubes are conical cylinders or tapered cylinders. As illustrated in FIG. 14A-FIG. 15B, the tubes connecting to leading edge 1505 are tapered to conform to leading edge 1505. In this instance, connecting truss members taper along the edge of blade 151 and diverge (e.g., spread out) from leading edge 1505 of blade 151 toward spine 1530 (e.g., back) of blade 151. In some embodiments, one or more connecting truss members of the nanolattice is a tube that tapers towards leading edge 1505. In some embodiments, one or more connecting truss members tapers toward the leading edge 1505 and forms ribs along the leading edge for reinforcement and reduced friction.

Figure 14A:
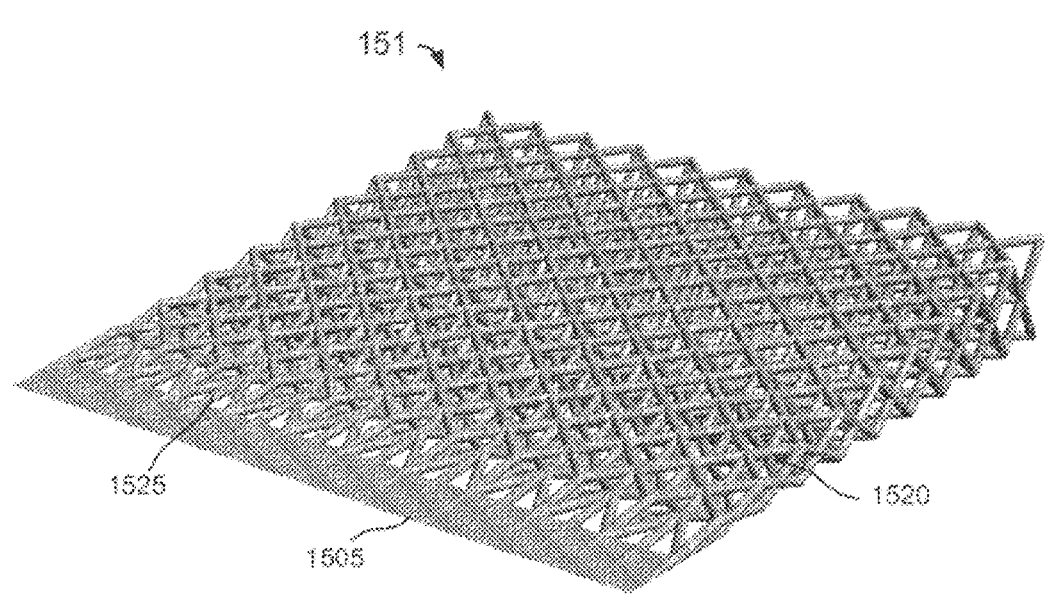
FIGS. 14A and 14B illustrate an ISO view and a plan view of a nanolattice blade with an octet-truss structure according to an embodiment of the present invention.
Figure 14B:
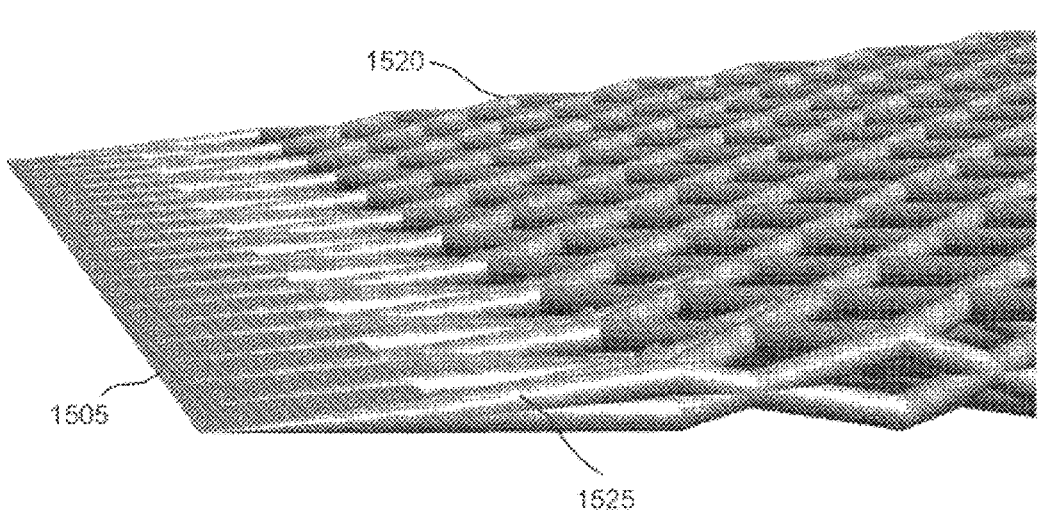

FIG. 14A-FIG. 14B depict various views of blade 151 with a nanolattice that forms an octet-truss structure. An octet-truss is a lightweight structure that distributes dominant forces among diagonal connecting truss members 1520. This means that portions of dominant compressive forces are converted to tensile force across the octet-truss. This makes the structure much less susceptible to failure because it can re-balance compressive load to tensile loads. In some embodiments, blade 151 is made of a metal.

In some embodiments, blade 151 is made of a ceramic. On the nano-scale, ceramics have been found to be remarkably less brittle and much stronger in tension. This means that hard ceramics such as alumina (e.g., corundum, sapphire)

and zirconia may be manufactured into blade 151 with a nanolattice (e.g., nanoblade) having an octet-truss that resists the impacts of cutting hair longer without fracturing or chipping when dropped. In some instances, the ceramic is zirconia or alumina.

Figure 15A:
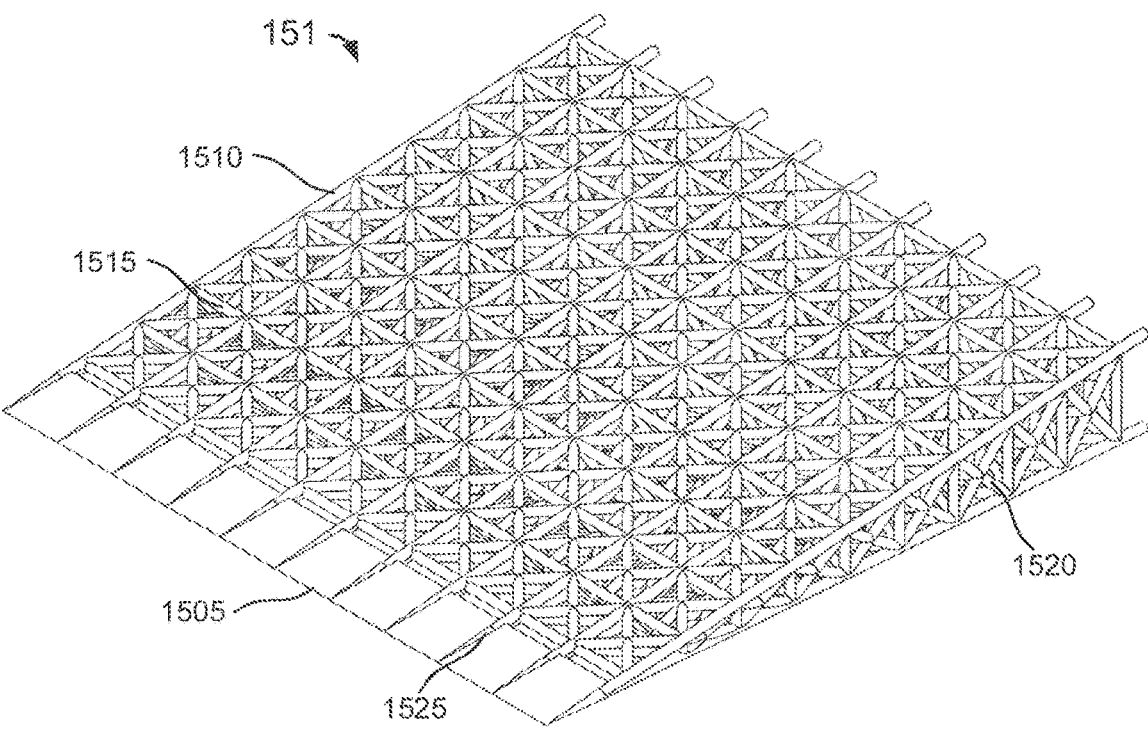
FIGS. 15A and 15B illustrate an ISO view and a plan view of a nanolattice blade with a rigidly reinforced truss structure according to an embodiment of the present invention.
Figure 15B:
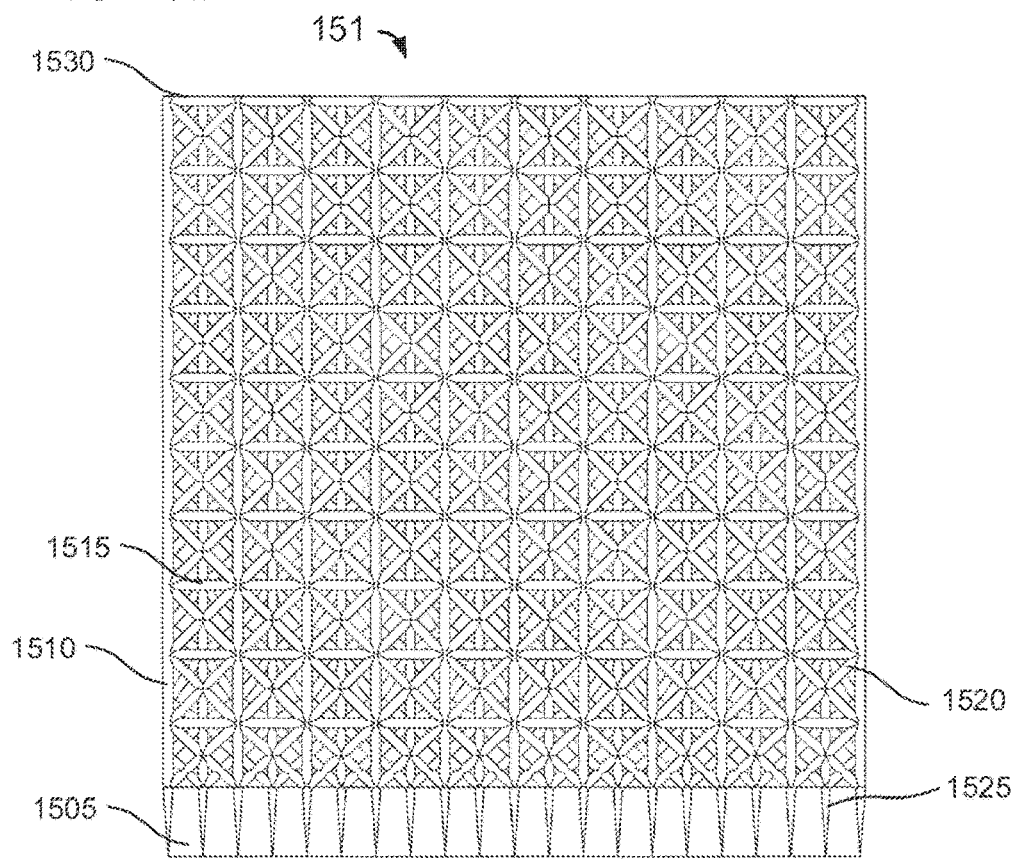

FIG. 15A-FIG. 15B depict various views of blade 151 with a nanolattice that forms additional connecting truss members to an octet-truss structure. In this instance, the octet-truss structure includes cross members that extends from spine 1530 to the leading edge and cross members that parallel to the leading edge. In some instances, the cross members are of a tetrahedral shape and added to the octahedral shape of the octet-truss. As a result, this structure includes more material over a unit volume than the octet-truss of FIG. 14A-14B, which makes it denser and heavier. In addition, the truss is more rigid because less portions of compressive force are rebalanced into tensile forces. This reinforcement may provide better support to the nanolattice structure, further allowing hard ceramics such as alumina (e.g., corundum, sapphire) and zirconia to be manufactured into blade 151 with a nanolattice (e.g., nano-blade) having the structure depicted in FIG. 15A-15B, which is less resistant to fracturing or chipping when compared to the nanolattice structure depicted in FIG. 14A-14B.

Although the techniques have been described in conjunction with particular embodiments, it should be appreciated that various modifications and alterations may be made by those skilled in the art without departing from the spirit and scope of the invention. Embodiments may be combined and aspects described in connection with an embodiment may stand alone.

What is claimed is:

1. A shaving system, comprising:
a handle;
a cutting member operably coupled to the handle and configured to contact a region of skin of a user during a shaving session;
a sensor configured to detect a force exerted by the user;
a feedback indicator disposed on the handle and including an indicator display, the indicator display configured to generate a first indication in response to and representative of the force detected by the sensor, the first indication including illumination of a light of the indicator display; and
a microcontroller operably coupled to the sensor and the feedback indicator, the microcontroller configured to generate a first signal based on the detected force and send the first signal to the feedback indicator such that the feedback indicator generates the first indication during the shaving session to assist the user with shaving,
the microcontroller configured to send a second signal indicative of a change in force to the feedback indicator such that the feedback indicator generates a second indication including illumination in response to and representative of the change in force during the shaving session to assist the user with shaving, the second indication being different than the first indication.

2. The shaving system of claim 1, wherein the light is a color light emitting diode (LED).

3. The shaving system of claim 1, wherein the sensor includes at least one of a force cell or a load cell.

4. The shaving system of claim 1, wherein the sensor is further configured to detect movement of the shaving system.

5. The shaving system of claim 1, wherein the microcontroller is further configured to generate the second signal based on the detected force and send the second signal to a device external to the handle and cutting member such that the device displays a message representative of the detected force to assist the user with shaving during the shaving session.

6. The shaving system of claim 5, wherein the message indicates a direction to move the cutting member.

7. The shaving system of claim 1, wherein the microcontroller is further configured to determine a duration of time the cutting member contacts the region of skin.

8. The shaving system of claim 1, wherein the sensor is a first sensor, the shaving system further comprising:
a second sensor configured to detect a parameter representative of hair density on the region of the skin, and wherein:
the microcontroller is operably coupled to the second sensor and configured to:
determine a density of the hair based on the detected parameter; and
generate an instruction to adjust operation of the cutting member based on the determined density of hair.

9. The shaving system of claim 8, wherein the microcontroller is configured to determine the density based on a stroke of the cutting member as the cutting member traverses the region of skin.

10. The shaving system of claim 1, wherein the sensor is a first sensor, the shaving system further comprising:
a second sensor configured to detect a parameter representative of a stroke of the shaving system across the region of skin, and wherein:
the microcontroller is operably coupled to the second sensor and configured to:
determine a stroke characteristic based on the detected parameter; and
generate a stroke performance indicator based on the determined stroke characteristic.

11. The shaving system of claim 10, wherein the microcontroller is configured to generate the stroke performance indicator further based on a comparison between the stroke characteristic and a threshold characteristic.

12. The shaving system of claim 10, wherein the second sensor is a load sensor, an optical sensor, a movement sensor, a friction sensor, or a temperature sensor.

13. The shaving system of claim 10, wherein the stroke characteristic includes at least one of a stroke count, a stroke direction, a stroke pressure, a stroke duration, or a stroke acceleration.

14. The shaving system of claim 10, wherein the stroke characteristic is indicative of a remaining life of the cutting member.

15. The shaving system of claim 10, wherein the microcontroller is further configured to generate a message configured to display the stroke performance indicator to a user of the shaving system.

16. The shaving system of claim 10, wherein the stroke performance indicator is a quantitative indicator.

17. The shaving system of claim 1, wherein:
the microcontroller is configured to:
monitor changes in force detected by the sensor and to generate a signal indicative of the change in force; and
generate a signal indicative of the change in force,
the feedback indicator being configured to adjust illumination in response to and representative of the change in force during the shaving session to assist the user with shaving.

18. The shaving system of claim 17, wherein the feedback indicator includes a color light-emitting diode (LED), the feedback indicator configured to cause the LED to adjust color or brightness in response to the change in force detected by the sensor.

19. A shaving system, comprising:

a handle;

a cutting member operably coupled to the handle and configured to contact a region of skin of a user during a shaving session;

a sensor configured to detect a force exerted by the user;

a feedback indicator disposed on the handle and including an indicator display, the indicator display configured to generate an indication in response to and representative of the force detected by the sensor; and a microcontroller operably coupled to the sensor and the feedback indicator, the microcontroller configured to generate a first signal based on the detected force and send the first signal to the feedback indicator such that the feedback indicator generates the indication during the shaving session to assist the user with shaving, the microcontroller configured to generate a second signal based on the detected force and send the second signal to a device external to the handle and cutting member such that the device displays a message representative of the detected force to assist the user with shaving during the shaving session.

20. The shaving system of claim 19, wherein the message indicates a direction to move the cutting member.

21. The shaving system of claim 19, wherein the sensor includes at least one of a force cell or a load cell.

22. The shaving system of claim 19, wherein the sensor is further configured to detect movement of the shaving system.

23. A shaving system, comprising:

a handle;

a cutting member operably coupled to the handle and configured to contact a region of skin of a user during a shaving session;

a sensor configured to detect a force exerted by the user;

a feedback indicator disposed on the handle and including an indicator display, the indicator display configured to generate an indication in response to and representative of the force detected by the sensor; and a microcontroller operably coupled to the sensor and the feedback indicator, the microcontroller configured to generate a signal based on the detected force and send the signal to the feedback indicator such that the feedback indicator generates the indication during the shaving session to assist the user with shaving, the microcontroller configured to determine a duration of time the cutting member contacts the region of skin.

24. The shaving system of claim 23, wherein the sensor includes at least one of a force cell or a load cell.

25. The shaving system of claim 23, wherein the sensor is further configured to detect movement of the shaving system.

26. A shaving system, comprising:

a handle;

a cutting member operably coupled to the handle and configured to contact a region of skin of a user during a shaving session;

a first sensor configured to detect a force exerted by the user;

a feedback indicator disposed on the handle and including an indicator display, the indicator display configured to generate a first indication in response to and representative of the force detected by the first sensor;

a second sensor configured to detect a parameter representative of hair density on the region of the skin; and a microcontroller operably coupled to the first sensor, the second sensor, and the feedback indicator, the microcontroller configured to generate a first signal based on the detected force and send the first signal to the feedback indicator such that the feedback indicator generates the first indication during the shaving session to assist the user with shaving, the microcontroller configured to determine a density of the hair based on the detected parameter and generate an instruction to adjust operation of the cutting member based on the determined density of hair.

27. The shaving system of claim 26, wherein the microcontroller is configured to determine the density based on a stroke of the cutting member as the cutting member traverses the region of skin.

28. The shaving system of claim 26, wherein the first sensor includes at least one of a force cell or a load cell.

29. The shaving system of claim 26, wherein the first sensor is further configured to detect movement of the shaving system.

30. A shaving system, comprising:

a handle;

a cutting member operably coupled to the handle and configured to contact a region of skin of a user during a shaving session;

a first sensor configured to detect a force exerted by the user;

a feedback indicator disposed on the handle and including an indicator display, the indicator display configured to generate a first indication in response to and representative of the force detected by the first sensor;

a second sensor configured to detect a parameter representative of a stroke of the shaving system across the region of skin; and a microcontroller operably coupled to the first sensor, the second sensor, and the feedback indicator, the microcontroller configured to generate a first signal based on the detected force and send the first signal to the feedback indicator such that the feedback indicator generates the first indication during the shaving session to assist the user with shaving, the microcontroller configured to determine a stroke characteristic based on the detected parameter and generate a stroke performance indicator based on the determined stroke characteristic.

31. The shaving system of claim 30, wherein the microcontroller is configured to generate the stroke performance indicator further based on a comparison between the stroke characteristic and a threshold characteristic.

32. The shaving system of claim 30, wherein the second sensor is a load sensor, an optical sensor, a movement sensor, a friction sensor, or a temperature sensor.

33. The shaving system of claim 30, wherein the stroke characteristic includes at least one of a stroke count, a stroke direction, a stroke pressure, a stroke duration, or a stroke acceleration.

34. The shaving system of claim 30, wherein the stroke characteristic is indicative of a remaining life of the cutting member.

35. The shaving system of claim 30, wherein the microcontroller is further configured to generate a message configured to display the stroke performance indicator to a user of the shaving system.

36. The shaving system of claim 30, wherein the stroke performance indicator is a quantitative indicator.

37. A shaving system, comprising:

a handle;

a cutting member operably coupled to the handle and configured to contact a region of skin of a user during a shaving session;

a sensor configured to detect a force exerted by the user;

a feedback indicator disposed on the handle and including an indicator display, the indicator display configured to generate a first indication in response to and representative of the force detected by the sensor, the first indication including illumination of a light of the indicator display; and a microcontroller operably coupled to the sensor and the feedback indicator, the microcontroller configured to generate a first signal based on the detected force and send the first signal to the feedback indicator such that the feedback indicator generates the first indication during the shaving session to assist the user with shaving, the microcontroller configured to monitor changes in force detected by the sensor and to generate a signal indicative of the change in force, the feedback indicator being configured to adjust illumination in response to and representative of the change in force during the shaving session to assist the user with shaving.

38. The shaving system of claim 37, wherein the feedback indicator includes a color light-emitting diode (LED), the feedback indicator configured to cause the LED to adjust color or brightness in response to the change in force detected by the sensor.

39. The shaving system of claim 37, wherein the sensor includes at least one of a force cell or a load cell.

40. The shaving system of claim 37, wherein the sensor is further configured to detect movement of the shaving system.

\* \* \* \* \*